United States Patent
Nishida

(10) Patent No.: US 10,862,293 B2
(45) Date of Patent: Dec. 8, 2020

(54) VEHICLE ELECTRONIC CONTROL APPARATUS

(71) Applicant: Mitsubishi Electric Corporation, Tokyo (JP)

(72) Inventor: Mitsunori Nishida, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 63 days.

(21) Appl. No.: 16/384,173

(22) Filed: Apr. 15, 2019

(65) Prior Publication Data

US 2020/0028348 A1     Jan. 23, 2020

(30) Foreign Application Priority Data

Jul. 23, 2018    (JP) .................................. 2018-137504

(51) Int. Cl.
| H02H 3/20 | (2006.01) |
| F02D 35/02 | (2006.01) |
| F02D 41/40 | (2006.01) |

(52) U.S. Cl.
CPC .............. *H02H 3/20* (2013.01); *F02D 35/02* (2013.01); *F02D 41/402* (2013.01)

(58) Field of Classification Search
CPC .......... H02H 3/20; H02H 7/067; H02H 9/005; B60R 16/033; F02D 41/221; F02D 41/30; F02D 41/20; F02D 41/345; F02D 41/28; F02D 2041/2051; F02D 2041/2068; F02D 2041/2048; F02D 2041/2003; F02D 2041/2041; H03K 17/0822; H03K 17/687; H02M 3/158; H01H 9/54
See application file for complete search history.

(56) References Cited

U.S. PATENT DOCUMENTS

2017/0089292 A1*  3/2017  Nishida ................. F02D 41/401

FOREIGN PATENT DOCUMENTS

| JP | 49-96249 | 9/1974 |
| JP | 2000-232771 A | 8/2000 |
| JP | 2012-80488 A | 4/2012 |
| JP | 2013-166359 A | 8/2013 |
| JP | 2014-126908 A | 7/2014 |
| JP | 2017-066960 A | 4/2017 |

OTHER PUBLICATIONS

Communication dated Jul. 2, 2019 by the Japanese Patent Office in application No. 2018-137504.

* cited by examiner

*Primary Examiner* — Bryan R Perez
(74) *Attorney, Agent, or Firm* — Sughrue Mion, PLLC; Richard C. Turner

(57) ABSTRACT

There is obtained an inexpensive vehicle electronic control apparatus that is shared by a plurality of inductive loads and performs rapid cutoff of a driving current with low power consumption. On/off operation of a load current preliminarily charges a surge suppression capacitor, which is connected with each of the upstream points of individual opening/closing devices, that are connected in series with each corresponding one of a plurality of inductive loads, by way of discharging diodes, respectively, up to a predetermined limit voltage V0; when following on/off operation generates an increment voltage ΔV in the charging voltage, a discharging transistor is closed and hence the surge suppression capacitor is discharge by way of a discharging resistor.

20 Claims, 7 Drawing Sheets

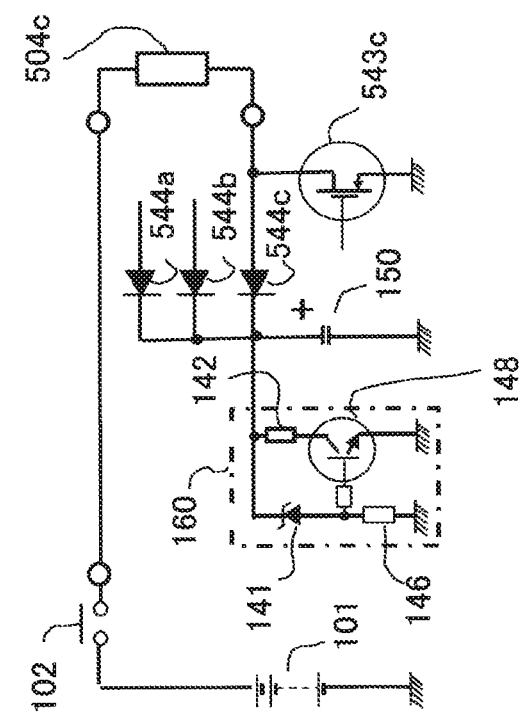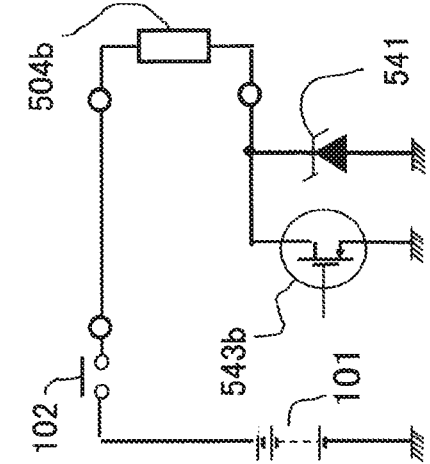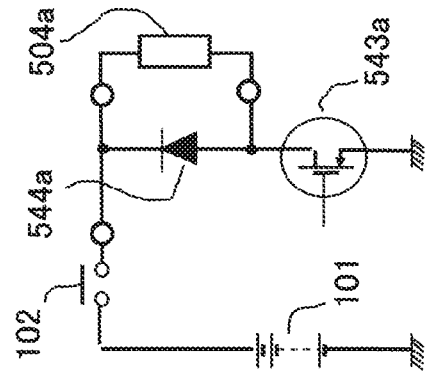

VEHICLE ELECTRONIC CONTROL APPARATUS

BACKGROUND OF THE INVENTION

Field of the Invention

The present application relates to a vehicle electronic control apparatus that performs a rapidly cutoff of a driving current for an inductive electric load and particularly to a vehicle electronic control apparatus improved to stably control a rapid cutoff characteristic.

Description of the Related Art

As is well known, in order to suppress a surge voltage to be generated at a time when a driving current for an inductive electric load exemplified by an electromagnetic valve, an electromagnetic relay, or the like, various forms of surge voltage suppression circuits are utilized. FIG. 7A is a circuit diagram representing part of a conventional vehicle electronic control apparatus. In FIG. 7A, a discharging diode 544a, which functions as a commutation diode, is connected in parallel with an inductive load 504a that is supplied with electric power from a vehicle battery 101 whose rated output voltage is, for example, DC 12 [V], via an output contact 102 of a power source relay and an opening/closing device 543a; a driving current at a time when the opening/closing device 543a has been closed is commutated to the discharging diode 544a and is attenuated when the opening/closing device 543a is opened.

The operating voltage of the inductive load including an electromagnetic valve or an electromagnetic relay is, for example, DC 6 [V] or so; when the normal voltage DC 14 [V] of the vehicle battery 101 is applied to the inductive load, the driving current is stabilized after rapidly increasing and then the electromagnetic valve or the electromagnetic relay operates. However, there has been a problem that when the non-operation restoration voltage at which the electromagnetic valve or the electromagnetic relay as the inductive load is restored to a non-operating state is, for example, DC 3 [V], the non-operation restoration timing at which the electromagnetic valve or the electromagnetic relay is restored to the non-operating state largely fluctuates because the current attenuation at a time after the opening/closing device 543a has been opened is slow.

FIG. 7B is a circuit diagram representing part of another conventional vehicle electronic control apparatus. In FIG. 7B, an inductive load 504b is supplied with electric power from the vehicle battery 101 whose rated output voltage is, for example, DC 12 [V], via the output contact 102 of the power source relay and an opening/closing device 543b; a voltage limiting diode 541 whose limitation operation voltage Vz is, for example, DC 50 [V] is connected in parallel with the opening/closing device 543b. In the conventional apparatus represented in FIG. 7B, when the opening/closing device 543b connected in series with the inductive load 504b is opened, a current at a time when the opening/closing device 543b has been closed flows, as a cutoff current I0, into the voltage limiting diode 541; in a cutoff time Tf, the cutoff current I0 is rapidly attenuated to [0].

As a result, there is demonstrated a characteristic that when the opening/closing device 543b is opened, the non-operation restoration timing at which the electromagnetic valve or the electromagnetic relay as the inductive load is restored to the non-operating state stabilizes; however, although it is temporary, excessive power consumption □ the maximum power consumption [I0×Vz]□ occurs in the voltage limiting diode 541; the value of the maximum power consumption is a value obtained by multiplying the power consumption in the inductive load 504b by the proportion of the limitation operation voltage to the battery voltage [Vz/Vbb].

As represented by an equation [<I0/2>×Vz×Tf/T0] with the proportion of the cutoff time Tf to an on/off period T0, the average power consumption in the voltage limiting diode 541 largely decreases due to the maximum power consumption [I0×Vz] that instantaneously occurs; however, because the maximum power consumption [I0×Vz] that instantaneously occurs is excessive, it is required to utilize the voltage limiting diode 541 having a large capacity.

Patent Document 1 discloses further another conventional vehicle engine control system; via the rapid magnetization opening/closing device 122j, the fuel-injection electromagnetic coil 103i in FIG. 1 is rapidly magnetized by the high-voltage capacitor 114a that is charged by the voltage boosting control circuit unit 110A to a boosted high voltage Vh1 of, for example, DC 72 [V]; after that, the battery voltage Vbb is applied to the fuel-injection electromagnetic coil 103i via the power-supply maintaining opening/closing device 121j; when the rapid cutoff opening/closing device 123i is opened in due course of time, the electromagnetic energy that has been accumulated in the electromagnetic coils 103i performs regenerative charging of the high-voltage capacitor 114a via the recovery diode 160i.

Accordingly, the conventional vehicle engine control system disclosed in Patent Document 1 has a characteristic that rapid cutoff of the electromagnetic coil 103i is performed and no power consumption occurs in the rapid cutoff circuit; because in this conventional system, the charging energy to be regenerated in the high-voltage capacitor 114a is smaller than the drive energy in the electromagnetic coil 103i that is required by the high-voltage capacitor 114a, the regenerative charging does not cause the charging voltage of the high-voltage capacitor 114a to become excessive.

PRIOR ART REFERENCE

Patent Document

[Patent Document 1] Japanese Patent Application Laid-Open No. 2017-066960

(1) Explanation for Problems in the Prior Art

As described above, in the conventional apparatus represented in FIG. 7, because rapid cutoff of the inductive load 504a cannot be performed, there has been a problem that the timing at which the electromagnetic valve or the electromagnetic relay as the inductive load is restored to the non-operating state becomes unstable. Moreover, in another conventional apparatus represented in FIG. 7B, there has been a problem that the instantaneous power consumption in the voltage limiting diode 541 becomes excessive and hence a large-capacity voltage limiting diode 541 is required. Furthermore, the vehicle engine control system disclosed in Patent Document 1 is suitable to the one in which charging energy for the high-voltage capacitor 114a can be recycled; however, there is left a problem that in the case of the inductive load that does not require rapid magnetization, an overcharge prevention circuit for the high-voltage capacitor is required.

Also in an apparatus other than the foregoing conventional apparatus, a snubber formed of a series circuit consisting of a surge voltage absorbing capacitor and a current limiting resistor is connected in parallel with the inductive device or the opening/closing device; however, because in the snubber circuit method, it is required that the electrostatic capacitance of the capacitor and the value of the current limiting resistor are separately determined in accordance with the characteristics of the inductive load, there is at least a problem that two or more inductive loads cannot share the snubber circuit.

(2) Explanation for the Objective of the Present Application

The present application has been implemented in order to solve the problems in the foregoing conventional apparatuses; the objective thereof is to provide a vehicle electronic control apparatus that suppresses instantaneous excessive power consumption that occurs in a rapid cutoff circuit and that makes it possible to reduce the cost burden.

SUMMARY OF THE INVENTION

A vehicle electronic control apparatus disclosed in the present application includes an opening/closing device connected in series with a single inductive load or each corresponding one of a plurality of inductive loads to which a battery voltage Vbb is supplied from a vehicle battery mounted in a vehicle, and a rapid cutoff circuit for suppressing a surge voltage generated when the opening/closing device is opened and for rapidly attenuating a driving current for the inductive load; the electric power steering apparatus is characterized in that the rapid cutoff circuit includes
  a discharging diode connected with the single inductive load or each corresponding one of the plurality of the inductive loads, and
  a surge suppression capacitor that suppresses an induction voltage generated by the inductive load to a predetermined limit voltage V0 and is shared by the inductive loads, in that the surge suppression capacitor is charged to an initial voltage from which the predetermined limit voltage V0 is obtained, with an initial charging voltage obtained by making any one of the opening/closing devices perform on/off energization of the inductive load or obtained from a voltage boosting control circuit unit, in that the rapid cutoff circuit further includes a discharge control circuit that discharges charges charged in the surge suppression capacitor, when the charging voltage V of the surge suppression capacitor or the value of a target voltage [V−Vbb] obtained by subtracting the battery voltage Vbb from the charging voltage V exceeds the limit voltage V0, in that the discharge control circuit includes
  a voltage limiting diode for setting at least the limit voltage V0,
  a discharging transistor that applies a discharge current Ix to the discharge control circuit when the charging voltage V of the surge suppression capacitor exceeds the target voltage, and
  a series resistor that is an equivalent discharging resistor formed of a discharging resistor for limiting the discharge current Ix to a value proportional to the target voltage or a constant current circuit for obtaining the discharge current Ix that is constant for a change in the target voltage, in that in the case where the vehicle battery exists in a charging path of the initial charging or in an energization path of the discharge current Ix, the charging voltage V becomes an addition voltage [V0+Vbb] obtained by adding the battery voltage Vbb to the limit voltage V0, and in the case where the vehicle battery exists neither in the charging path nor in the energization path, the discharge current Ix is controlled so that the charging voltage V becomes equal to the limit voltage V0, and in that the lower limit of each of individual on/off periods T0i, which are the respective individual on/off periods of the opening/closing devices, is restricted in such a way as to become the same as or larger than a representative on/off period [T0=ΣTfi×2], which is twice as large as the sum value of individual cutoff times Tfi in each of which the individual opening/closing device is opened and an individual cutoff current I0i flowing in the individual inductive load is attenuated to zero.

In a vehicle electronic control apparatus, disclosed in the present application, including an opening/closing device connected in series with a single inductive load or each corresponding one of a plurality of inductive loads to which a battery voltage Vbb is supplied and a rapid cutoff circuit for suppressing a surge voltage generated when the opening/closing device is opened and for rapidly attenuating a load voltage in the inductive load, the rapid cutoff circuit has a common surge suppression capacitor connected with a discharging diode connected with a single inductive load or each corresponding one of a plurality of the inductive loads, and the surge suppression capacitor is charged to an initial voltage from which a predetermined limit voltage V0 is obtained; the rapid cutoff circuit further includes a discharge control circuit that suppresses the surge suppression capacitor from being excessively charged, and the discharge control circuit includes a voltage limiting diode for setting at least the limit voltage V0 and a discharging transistor and a series resistor for limiting a discharge current Ix flowing into the discharge control circuit; the lower limit of each of respective on/off periods T0i of the opening/closing devices is restricted in such a way as to become the same as or larger than the sum value of individual cutoff times Tfi of a plurality of the opening/closing devices ([T01≥2×ΣTfi]).

Accordingly, the respective open-circuit surge voltages of the plurality of the opening/closing devices are suppressed by the common surge suppression capacitor and the discharge control circuit, and because after initial charging of the surge suppression capacitor has been performed, rapid cutoff for the inductive load can be implemented, the cutoff control performance for the inductive load stabilizes.

In contrast to the individual cutoff current I0i of the inductive load that is attenuated in a short individual cutoff time Tfi, an individual discharge current Ixi is a current of substantially a constant value and it is only necessary that the discharging is completed within the duration of a predetermined long-time representative on/off period [T0≥2× ΣTfi]; thus, even in the case of the discharge current [Ix=ΣIxi], which is the sum value of the plurality of individual discharge currents Ixi, it is made possible to suppress an instantaneous excessive loss from occurring in the discharge control circuit for absorbing the surge voltage and hence in expensive circuit components can be utilized. Moreover, in the case where the surge suppression capacitor and the discharge control circuit are shared and applied to a plurality of inductive loads, there is demonstrated an effect that the cost burden can further be reduced. In the case where initial charging of the surge suppression capacitor is performed through on/off operation of the inductive load, the rapid cutoff function for the inductive load is gradually improved until the charging voltage V of the surge suppression capacitor reaches the limit voltage V0 or the addition value of the limit voltage V0 and the battery voltage Vbb; however, the discharge control circuit prohibits the discharge current Ix from occurring in the initial charging period, so that the initial charging can rapidly be completed.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 2A represents the case where a junction-type transistor is utilized;

FIG. 2B represents the case where the second discharge control circuit is formed by use of a junction-type transistor;

FIG. 2C represents the case where a junction-type transistor is utilized;

FIG. 3A represents the case where a field-effect transistor is utilized;

FIG. 3B represents the case where the second discharge control circuit is formed by use of a field-effect transistor;

FIG. 3C represents the case where the third discharge control circuit is formed by use of a field-effect transistor;

FIG. 7A is a circuit diagram representing part of a conventional vehicle electronic control apparatus;

FIG. 7B is a circuit diagram representing part of another conventional vehicle electronic control apparatus; and FIG. 7C is a circuit diagram, of part of a vehicle electronic control apparatus according to the present application, for explaining the operational principle of the vehicle electronic control apparatus.

DETAILED DESCRIPTION OF THE PREFERRED EMBODIMENTS

Figure 1:
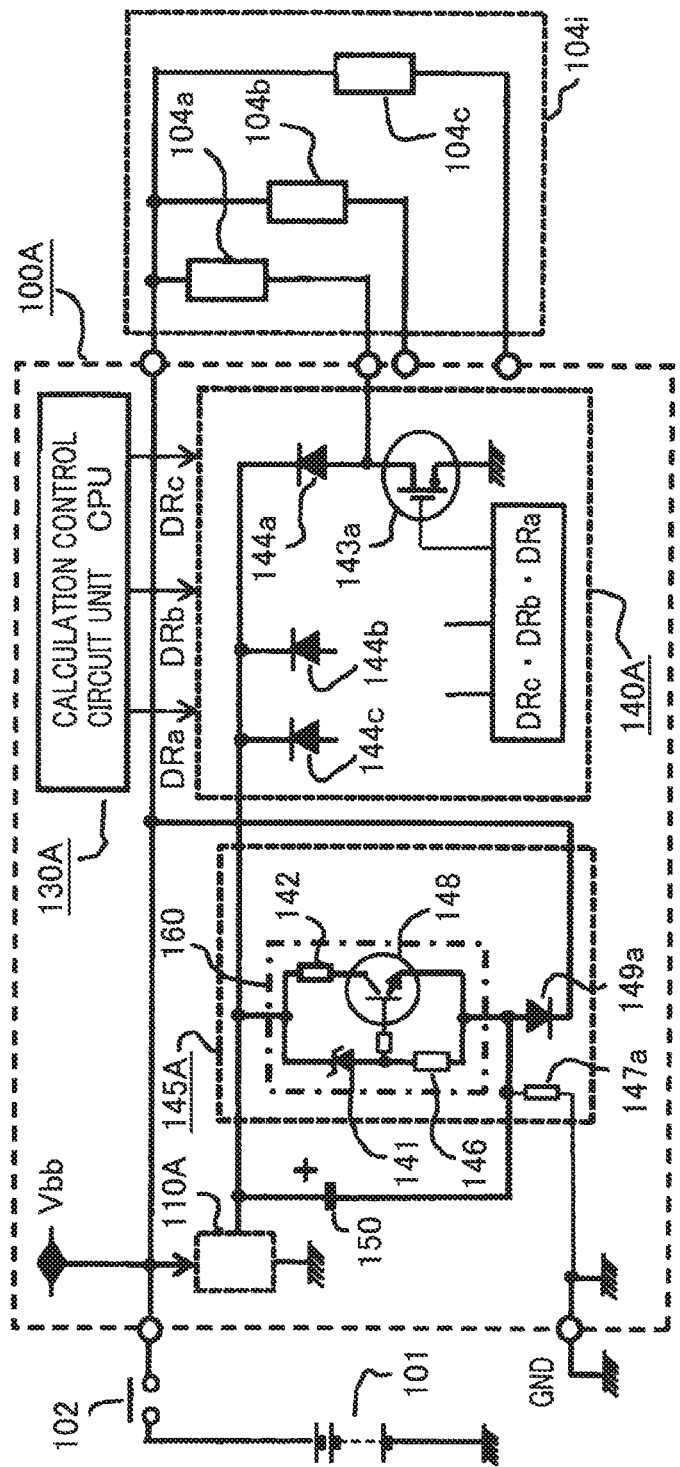
FIG. 1 is a block diagram illustrating the overall configuration of a vehicle electronic control apparatus according to Embodiment 1.

At first, the outline of a vehicle electronic control apparatus according to the present application will be explained. FIG. 7C is a circuit diagram, of part of a vehicle electronic control apparatus according to the present application, for explaining the operational principle of the vehicle electronic control apparatus. In the following explanation, there may be a case where the explanation is made while describing after-mentioned inductive loads 504a, 504b, and 504c as "504i", by replacing the characters a, b, and c by a representative character "i"; there may be a case where the explanation is made while describing opening/closing devices 543a, 543b, and 543c as "543i", by replacing the characters a, b, and c by the representative character "i"; similarly, there may be a case where the explanation is made while describing discharging diodes 544a, 544b, and 544c as "544i", by replacing the characters a, b, and c by the representative character "i".

In FIG. 7C, the opening/closing device 543c performs power-supply driving of the inductive load 504c by way of a vehicle battery 101 of, for example, DC 12 [V] and an output contact 102 of a power source relay. A surge suppression capacitor 150 is connected in parallel with the opening/closing device 543c by way of the discharging diode 544c. A discharge control circuit 160 is connected in parallel with the surge suppression capacitor 150.

The discharge control circuit 160 is provided with a discharging resistor 142 whose one end is connected with the positive-polarity terminal of the surge suppression capacitor 150, a discharging transistor 148 whose corrector is connected with the other terminal of the discharging resistor 142 and whose emitter is grounded, a voltage limiting diode 141 whose cathode is connected with the one end of the discharging resistor 142 and whose anode is connected with the base of the discharging transistor 148 via a resistor, and a driving resistor 146 whose one end is connected with the anode of the voltage limiting diode 141 and whose other end is grounded.

When the charging voltage V of the surge suppression capacitor 150 exceeds a limit voltage [V0=Vz+Vd], which is the addition value of the limitation operation voltage Vz of, for example, DC 50 [V] set by the voltage limiting diode 141 and the operating voltage Vd of the discharging transistor 148, the discharging transistor 148 is closed via the driving resistor 146; then, a discharge current [Ix=V/Rx] limited by a discharge resistance Rx of the discharging resistor 142 flows in the discharging resistor 142, which is in series with the discharging transistor 148.

The limitation operation voltage Vz is much larger than the operating voltage Vd and the limit voltage V0 is approximately equal to Vz; concurrently, the discharging diode 544i always prevents the charges charged in the surge suppression capacitor 150 from being reversely discharged via the inductive load 504c or the opening/closing device 543c.

In this situation, in the case where as represented in FIG. 7B, no surge suppression capacitor is provided, an individual cutoff current I0i at a time when the opening/closing device 543b is opened flows into the voltage limiting diode 541 and is attenuated to zero in a short individual cutoff time Tfi; the peak electric power to be generated in the voltage limiting diode 541 at this time becomes [Vz×I0i≈V0×I0i], and individual discharge energy E0i approximately equal to [Tfi×V0×I0i/2]. In this regard, however, as long as the respective driving currents for two or more inductive loads are not cut off simultaneously, the maximum value of the peak electric power to be generated in the voltage limiting diode 541 is determined by the product of the maximum cutoff current I0*i* and the limit voltage V0.

In contrast, in the case of FIG. 7C, electromagnetic energy in the inductive load 504*c* at a time when the opening/closing device 543*c* is opened is accumulated in the surge suppression capacitor 150; because it is only necessary that the accumulated electric charges are discharged within an individual on/off period T0*i* of the opening/closing device 543*c*, which is sufficiently longer than the individual cutoff time Tf*i* of the inductive load 504*c*, an individual discharge current Ix*i* can be suppressed to the value obtained by multiplying the average value of the individual cutoff current I0*i* (the middle value I0*i*/2 between I0*i* and 0 to which I0*i* is attenuated) by the value Tf*i*/T0*i* [the equation: Ix*i*=0.5×I0*i*×Tf*i*/T0*i*]; thus, the peak power consumption that occurs in the discharge control circuit 160 can largely be suppressed.

Because a power-supply driving time Ton for the inductive load 504*c* is longer than a rapid cutoff time Tf*i*, the equation [T0*i*=Ton+Tf*i*≥2Tf*i*] for the individual on/off period is established even when an open-circuit duration Tff is neglected; thus, the substitution of [Tf*i*/T0*i*≤0.5] for the foregoing equation [Ix*i*=0.5×I0*i*×Tf*i*/T0*i*] suggests that it is only necessary that the individual discharge current Ix*i* corresponding to the individual cutoff current I0*i* is the same as or smaller than one-fourth of the individual cutoff current I0*i*; therefore, in each of the sum values, the relationship [ΣIx*i*≤ΣI0*i*/4] is established.

In the following description, the individual on/off period T0*i* and a representative on/off period T0 are defined as represented in the equation (1) below.

$$T0i \geq Tfi + \Sigma Tfi > 2 \times Tfi, T0 \geq 2 \times \Sigma Tfi \geq T0i \tag{1}$$

Next, the total electromagnetic energy EE*i* to be discharged when the total load current of n inductive loads is cut off at once or is cut off only one time in a sequential manner is represented in the equation (2) below.

$$\Sigma Ei = \Sigma L0i \times I0i^2/2 = n \times L0 \times I0^2/2 \tag{2}$$

where L0*i*, I0*i*, L0, I0, and n denote the inductance of an individual inductive load 104*i*, the cutoff current of the individual inductive load 104*i*, the inductance of a representative inductive load, the cutoff current of the representative inductive load, and the number of the inductive loads.

Then, when it is assumed that the surge suppression capacitor 150 has an electrostatic capacitance C with which the voltage thereof does not reach the limit voltage V0 with only one-time electromagnetic energy represented in the equation (2), the equation (3) below is established.

$$\Sigma Ei < C \times V0^2/2 \tag{3}$$

In addition, the increment voltage ΔV of the surge suppression capacitor 150, which occurs when the total load current of n inductive loads is cut off at once or is cut off only one time in a sequential manner after the surge suppression capacitor 150 has initially been charged up to the limit voltage V0, is represented in the equation (4) below.

$$\Sigma Ei = C \times [(V0+\Delta V)^2 - V0^2]/2 \tag{4}$$

The equation (5) below is obtained from the foregoing equations (2) and (3).

$$\Delta V/V0 < \sqrt{2} - 1 \approx 0.4 \tag{5}$$

In contrast, an initial charge number N required for charging the surge suppression capacitor by disconnecting and connecting a single representative load so that the charging voltage V becomes a predetermined limit voltage V0 is calculated through the equation (6) below.

$$L0 \times I0^2 \times N/2 = C \times V0^2/2 \therefore N = (C/L0) \times (V0/I0)^2 \tag{6}$$

The increment voltage ΔV of the surge suppression capacitor at a time when after the initial charge has been completed, a single representative load is disconnected and connected only once is calculated through the equation (7) below.

$$L0 \times I0^2/2 = C \times [(V0+\Delta V)^2 - V0^2]/2 \therefore L0/C = (V0/I0)^2[(1+\Delta V/V0)^2 - 1] \tag{7}$$

The equation (8) below is obtained from the foregoing equations (6) and (7).

$$\Delta V/V0 = \sqrt{(1+1/N)} - 1 \tag{8}$$

In the equation (8), when [N=1], the foregoing equation (5) is obtained; when [N=5], the equation [ΔV/V0=0.095] is established; when [N=10], the equation [ΔV/V0=0.049] is established. Therefore, in the practical specification, it is desirable that N is the same as or larger than 10.

Next, when it is assumed that the number of loads, among two or more inductive loads, that are simultaneously deenergized within the representative on/off period T0 is "n", the total discharging electric power to be generated by the n representative inductive loads, i.e., the total power consumption P that occurs in the discharge control circuit 160 is represented by the equation (9) below.

$$P = \Sigma Ei/T0 = 0.5 \times n \times L0 \times I0^2/T0 = \Sigma Ixi \times V0 \tag{9}$$

The equation (10) below is obtained by modifying the equation (9).

$$\Sigma Ixi/(I0 \times n) = 0.5 \times [L0 \times I0/T0]/V0 \tag{10}$$

In this situation, the value of L0×I0/T0 is the induction voltage at a time when a voltage, with which the current increasing rate becomes (I0/T0), is applied to a representative inductance L0, and this induction voltage does not exceed a battery voltage Vbb; thus, the equation (10a) below is obtained.

$$\Sigma Ixi/I0 < 0.5 \times (Vbb/V0) \times n \tag{10a}$$

Accordingly, when V0 is set to be the same as or larger than 2Vbb, the equation [ΣIxi/I0<1] is established even when n is 4; therefore, the total discharge current [ΣIxi=Ix] for the discharge control circuit 160 in FIG. 7C is smaller than [4×representative cutoff current I0] for the voltage limiting diode 541 in FIG. 7B in which no surge suppression capacitor 150 is provided and is smaller than a single representative cutoff current I0. When in the practical specification, V0 is set to be the same as or larger than 4Vbb, the equation [ΣIxi/I0<0.9] is established even when n is equal to 6; thus, even in the simultaneous cutoff with n of 6 or smaller, the total discharge current [ΣIxi=Ix] is smaller than a single representative cutoff current I0.

Embodiment 1

Hereinafter, a vehicle electronic control apparatus 100A according to Embodiment 1 will be explained in detail.

(1) Detailed Explanation for Embodiment 1

FIG. 1 is a block diagram representing the overall configuration of a vehicle electronic control apparatus according to Embodiment 1. In FIG. 1, by way of the output contact 102 of the power source relay, the battery voltage Vbb of the vehicle battery 101 is applied to the respective upstream ends of two or more inductive loads 104*a*, 104*b*, and 104*c* (in the following explanation, the characters a, b, and c may be represented by "i"). The downstream ends of the inductive loads 104a, 104b, and 104c are connected with the ground line GND with which the negative-polarity terminal of the vehicle battery 101 is connected, by way of the opening/closing devices 143a, 143b, and 143c (143b and 143c are not represented in FIG. 1), respectively.

The respective downstream ends of the inductive loads 104a, 104b, and 104c are connected with the positive-polarity terminal of the surge suppression capacitor 150 by way of the discharging diodes 144a, 144b, and 144c, respectively. The negative-polarity terminal of the surge suppression capacitor 150 is connected with the upstream ends of the inductive loads 104a, 104b, and 104c by way of the short-circuit prevention diode 149.

The surge suppression capacitor 150 is connected in parallel with a series circuit consisting of the discharging transistor 148 and the discharging resistor 142, as the discharge control circuit 160 which is a main member of an excessive-charging prevention circuit 145, and is connected also in parallel with a series circuit consisting of the voltage limiting diode 141 and the driving resistor 146. The increment voltage ΔV, obtained by subtracting the limitation operation voltage Vz of the voltage limiting diode 141 from the charging voltage V of the surge suppression capacitor 150, is applied, as the voltage across the driving resistor 146, to the driving terminal of the discharging transistor 148.

When all of the opening/closing devices 143a, 143b, and 143c are opened, the battery voltage Vbb is applied to the positive-polarity terminal of the surge suppression capacitor 150, via all of the inductive loads 104a, 104b, and 104c and all of the discharging diodes 144a, 144b, and 144c; then, preliminary charging is performed through a first preliminary charging resistor 147a that is connected between the negative-polarity terminal of the surge suppression capacitor 150 and the ground line GND.

A calculation control circuit unit 130A including a microprocessor CPU generates drive command signals DRa, DRb, and DRc for the opening/closing devices 143a, 143b, and 143c, respectively, so as to perform on/off driving control of the opening/closing devices 143a, 143b, and 143c, which are main members of an opening/closing control circuit 140A. The vehicle electronic control apparatus 100A includes the calculation control circuit unit 130A, the opening/closing control circuit 140A, the excessive-charging prevention circuit 145A, and the surge suppression capacitor 150; a voltage boosting control circuit unit 110A that corresponds to a voltage boosting control circuit unit 110C, described later in FIG. 5, may concurrently be utilized.

In the vehicle electronic control apparatus 100A according to Embodiment 1 represented in FIG. 1, the opening/closing devices 143a, 143b, and 143c are connected with the downstream positions of the inductive loads 104a, 104b, and 104c, respectively; in addition to that, the parallel circuit consisting of the excessive-charging prevention circuit 145A and the surge suppression capacitor 150 is connected in parallel with the respective inductive loads 104a, 104b, and 104c, by way of the short-circuit prevention diode 149a and the discharging diodes 144a, 144b, and 144c.

Figure 2A:
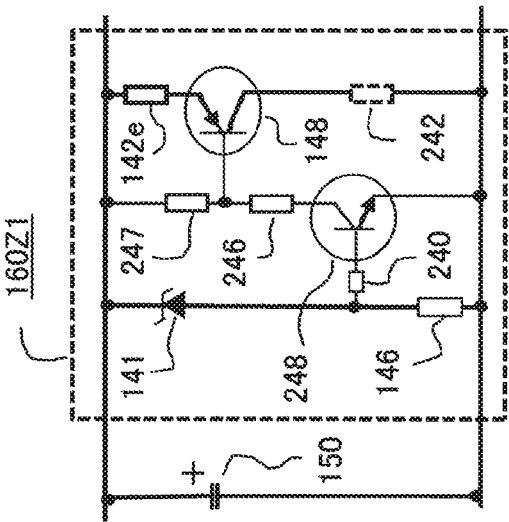
FIG. 2A is a circuit diagram representing a first discharge control circuit in a vehicle electronic control apparatus according to any one of Embodiments 1 through 4.

Next, the specific configuration of the discharge control circuit 160, described above, will be explained. FIG. 2A is a circuit diagram representing the first discharge control circuit in the vehicle electronic control apparatus according to Embodiment 1; FIG. 2A represents the case where as the first discharge control circuit, a junction-type transistor is utilized. The reference character "160X1" represented in FIG. 2A is the first discharge control circuit, as a specific example of the discharge control circuit 160 in FIG. 1. In FIG. 2A, the surge suppression capacitor 150 is connected with the series circuit consisting of the driving resistor 146 and the voltage limiting diode 141 that becomes conductive when the application voltage is the same as or higher than the limitation operation voltage Vz, and is connected also in parallel with the series circuit consisting of the discharging resistor 142 and the NPN-type discharging transistor 148. The voltage across the driving resistor 146 is applied between the base terminal and the emitter terminal of the discharging transistor 148, by way of the current limiting resistor 240.

Accordingly, when the charging voltage V of the surge suppression capacitor 150 exceeds the limit voltage [V0=Vz+Vd], which is the addition value of the limitation operation voltage Vz of the voltage limiting diode 141 and the operating voltage Vd of the discharging transistor 148, the discharging transistor 148 undergoes circuit-closing driving, so that a discharge current [Ix=V/Rx] inversely proportional to the discharge resistance Rx, which is the resistance value of the discharging resistor 142, flows in the discharging resistor 142.

In the case where the respective connection positions of the voltage limiting diode 141 and the driving resistor 146 are exchanged with each other so that the driving resistor 146 is disposed at the upstream side of the voltage limiting diode 141, the discharging transistor 148 is also disposed at the upstream side thereof and a PNP-type transistor is utilized.

Figure 3C:
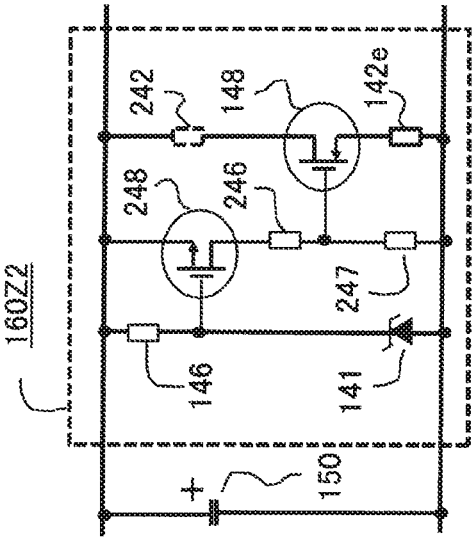
FIG. 3C is a circuit diagram representing a variant example of the third discharge control circuit in a vehicle electronic control apparatus according to any one of Embodiments 1 through 4.
Figure 3B:
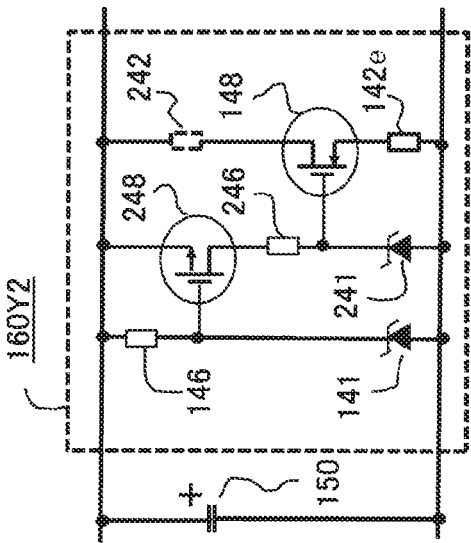
FIG. 3B is a circuit diagram representing a variant example of the second discharge control circuit in a vehicle electronic control apparatus according to any one of Embodiments 1 through 4.
Figure 3A:
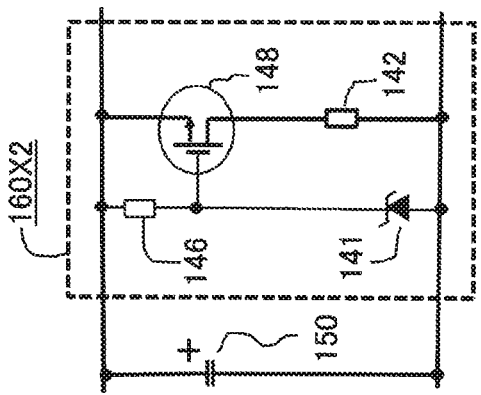
FIG. 3A is a circuit diagram representing a variant example of the first discharge control circuit in a vehicle electronic control apparatus according to any one of Embodiments 1 through 4.

The case where as the discharge control circuit 160, a field-effect transistor is utilized will be explained. FIG. 3A is a circuit diagram representing a variant example of the first discharge control circuit in the vehicle electronic control apparatus according to Embodiment 14; FIG. 3A represents the case where a field-effect transistor is utilized. The reference character "160X2" represented in FIG. 3A is a variant example of the first discharge control circuit, described above. In FIG. 3A, the surge suppression capacitor 150 is connected with the series circuit consisting of the driving resistor 146 and the voltage limiting diode 141 that becomes conductive when the application voltage is the same as or higher than the limitation operation voltage Vz, and is connected also in parallel with the series circuit consisting of the discharging resistor 142 and the P-channel-type discharging transistor 148. The voltage across the driving resistor 146 is applied between the source terminal and the gate terminal of the discharging transistor 148.

Accordingly, when the charging voltage V of the surge suppression capacitor 150 exceeds the limit voltage [V0=Vz+Vd], which is the addition value of the limitation operation voltage Vz of the voltage limiting diode 141 and the operating voltage Vd of the discharging transistor 148, the discharging transistor 148 undergoes circuit-closing driving, so that a discharge current [Ix=V/Rx] inversely proportional to the discharge resistance Rx, which is the resistance value of the discharging resistor 142, flows in the discharging resistor 142.

In the case where the respective connection positions of the voltage limiting diode 141 and the driving resistor 146 are exchanged with each other so that the driving resistor 146 is disposed at the downstream side of the voltage limiting diode 141, the discharging transistor 148 is also disposed at the downstream side thereof and an N-channel-type transistor is utilized.

Figure 2B:
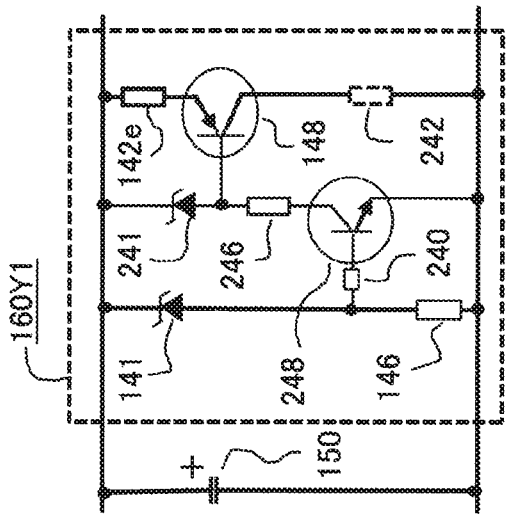
FIG. 2B is a circuit diagram representing a second discharge control circuit in a vehicle electronic control apparatus according to any one of Embodiments 1 through 4.

Next, the configuration of a second discharge control circuit, as the discharge control circuit, utilizing a junction-type transistor will be explained. FIG. 2B is a circuit diagram representing a second discharge control circuit in the vehicle electronic control apparatus according to Embodiment 1, and FIG. 2B represents the case where as the second discharge control circuit, a junction-type transistor is utilized. The reference character "160Y1" represented in FIG. 2B is the second discharge control circuit, as a specific example of the discharge control circuit 160 in FIG. 1. In FIG. 2B, the surge suppression capacitor 150 is connected with the series circuit consisting of the driving resistor 146 and the voltage limiting diode 141 that becomes conductive when the application voltage is the same as or higher than the limitation operation voltage Vz, and is connected also in parallel with the series circuit consisting of an equivalent discharging resistor 142e and the PNP-type discharging transistor 148; furthermore, the series circuit consisting of an intermediary voltage limiting diode 241, an intermediary driving resistor 246, and an intermediary transistor 248 is connected with the surge suppression capacitor 150.

The voltage across the driving resistor 146 is applied between the base terminal and the emitter terminal of the NPN-type intermediary transistor 248, by way of the current limiting resistor 240; an intermediary limit voltage Ve of the intermediary voltage limiting diode 241 is applied between the emitter terminal and the base terminal of the discharging transistor 148, by way of the equivalent discharging resistor 142e. When a heat dispersing resistor 242 is connected in series with the collector terminal of the discharging transistor 148, a discharge current Ix can be suppressed from causing heat generation in the discharging transistor 148.

Accordingly, when the charging voltage V of the surge suppression capacitor 150 exceeds the limit voltage [V0=Vz+Vd], which is the addition value of the limitation operation voltage Vz of the voltage limiting diode 141 and the operating voltage Vd of the intermediary transistor 248, the intermediary transistor 248 undergoes circuit-closing driving, so that the intermediary limit voltage Ve for performing energization drive of the discharging transistor 148 is generated. As a result, there is generated a feedback voltage [Rx×Ix] that is the multiplication product of a discharge resistance Rx, which is the resistance value of the equivalent discharging resistor 142e, and the discharge current Ix that flows in the equivalent discharging resistor 142e; then, a constant discharge current [Ix=(Ve−Vd)/Rx] flows in accordance with the equation [Ve=Rx×Ix+Vd] in which the voltage obtained by adding the operating voltage Vd of the discharging transistor 148 to the feedback voltage becomes equal to the intermediary limit voltage Ve.

In the case where the respective connection positions of the voltage limiting diode 141 and the driving resistor 146 are exchanged with each other, the PNP-type transistor and the NPN-type transistor are replaced by each other and then utilized.

Next, as the discharge control circuit, there will be explained a variant example of the second discharge control circuit utilizing a field-effect transistor. FIG. 3B is a circuit diagram representing a variant example of the second discharge control circuit in the vehicle electronic control apparatus according to Embodiment 1, and FIG. 3B represents the case where the second discharge control circuit is formed by use of a field-effect transistor. The reference character "160Y2" represented in FIG. 3B is a variant example of the second discharge control circuit, described above. In FIG. 3B, the surge suppression capacitor 150 is connected with the series circuit consisting of the driving resistor 146 and the voltage limiting diode 141 that becomes conductive when the application voltage is the same as or higher than the limitation operation voltage Vz, and is connected also in parallel with the series circuit consisting of the equivalent discharging resistor 142e and the N-channel-type discharging transistor 148; furthermore, the series circuit consisting of the intermediary transistor 248, the intermediary driving resistor 246, and the intermediary voltage limiting diode 241 is connected with the surge suppression capacitor 150.

The voltage across the driving resistor 146 is applied between the source terminal and the gate terminal of the P-channel-type intermediary transistor 248; the intermediary limit voltage Ve of the intermediary voltage limiting diode 241 is applied between the gate terminal and the source terminal of the discharging transistor 148, by way of the equivalent discharging resistor 142e. When the heat dispersing resistor 242 is connected in series with the drain terminal of the discharging transistor 148, the discharge current Ix can be suppressed from causing heat generation in the discharging transistor 148.

Accordingly, when the charging voltage V of the surge suppression capacitor 150 exceeds the limit voltage [V0=Vz+Vd], which is the addition value of the limitation operation voltage Vz of the voltage limiting diode 141 and the operating voltage Vd of the intermediary transistor 248, the intermediary transistor 248 undergoes circuit-closing driving, so that the intermediary limit voltage Ve for performing energization drive of the discharging transistor 148 is generated.

As a result, there is generated a feedback voltage [Rx×Ix] that is the multiplication product of a discharge resistance Rx, which is the resistance value of the equivalent discharging resistor 142e, and the discharge current Ix that flows in the equivalent discharging resistor 142e; then, a constant discharge current [Ix=(Ve−Vd)/Rx] flows in accordance with the equation [Ve=Rx×Ix+Vd] in which the voltage obtained by adding the operating voltage Vd of the discharging transistor 148 to the feedback voltage becomes equal to the intermediary limit voltage Ve.

In the case where the respective connection positions of the voltage limiting diode 141 and the driving resistor 146 are exchanged with each other, the P-channel-type transistor and the N-channel-type transistor are replaced by each other and then utilized.

Figure 2C:
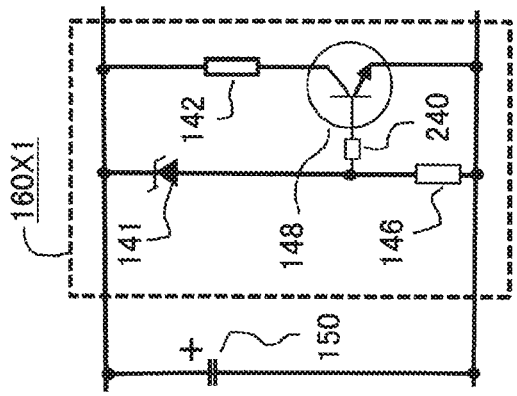
FIG. 2C is a circuit diagram representing a third discharge control circuit in a vehicle electronic control apparatus according to any one of Embodiments 1 through 4.

Next, the configuration of a third discharge control circuit, as the discharge control circuit, utilizing a junction-type transistor will be explained. FIG. 2C is a circuit diagram representing a third discharge control circuit in the vehicle electronic control apparatus according to Embodiment 1; FIG. 2C represents the case where the third discharge control circuit is formed by use of a junction-type transistor. The reference character "160Z1" represented in FIG. 2C is the third discharge control circuit, as a specific example of the discharge control circuit 160 in FIG. 1. In FIG. 2C, the surge suppression capacitor 150 is connected with the series circuit consisting of the driving resistor 146 and the voltage limiting diode 141 that becomes conductive when the application voltage is the same as or higher than the limitation operation voltage Vz, and is connected also in parallel with the series circuit consisting of the equivalent discharging resistor 142e and the PNP-type discharging transistor 148; furthermore, the series circuit consisting of a pair of intermediary driving resistors 246 and 247 and the intermediary transistor 248 is connected with the surge suppression capacitor 150.

The voltage across the driving resistor 146 is applied between the base terminal and the emitter terminal of the NPN-type intermediary transistor 248, by way of the current limiting resistor 240; a divided voltage γV of the charging voltage V obtained through the upstream intermediary driving resistor 247 is applied between the emitter terminal and the base terminal of the discharging transistor 148, by way of the equivalent discharging resistor 142*e*.

When a heat dispersing resistor 242 is connected in series with the collector terminal of the discharging transistor 148, a discharge current Ix can be suppressed from causing heat generation in the discharging transistor 148.

Accordingly, when the charging voltage V of the surge suppression capacitor 150 exceeds the limit voltage [V0=Vz+Vd], which is the addition value of the limitation operation voltage Vz of the voltage limiting diode 141 and the operating voltage Vd of the intermediary transistor 248, the intermediary transistor 248 undergoes circuit-closing driving, so that the divided voltage γV for performing energization drive of the discharging transistor 148 is generated. In this regard, however, γ is the voltage division ratio obtained through a pair of the intermediary driving resistors 246 and 247.

As a result, there is generated a feedback voltage [Rx×Ix] that is the multiplication product of a discharge resistance Rx, which is the resistance value of the equivalent discharging resistor 142*e*, and the discharge current Ix that flows in the equivalent discharging resistor 142*e*; then, a discharge current [Ix=(γV−Vd)/Rx] flows in accordance with the equation [γV=Rx×Ix+Vd] in which the voltage obtained by adding the operating voltage Vd of the discharging transistor 148 to the feedback voltage becomes equal to the divided voltage γV; the discharge current Ix is changeable depending on the value of the charging voltage V.

In the case where the respective connection positions of the voltage limiting diode 141 and the driving resistor 146 are exchanged with each other, the PNP-type transistor and the NPN-type transistor are replaced by each other and then utilized.

Next, the configuration of the third discharge control circuit, as the discharge control circuit, utilizing a field-effect transistor will be explained. FIG. 3C is a circuit diagram representing a variant example of the third discharge control circuit in the vehicle electronic control apparatus according to Embodiment 1, and FIG. 3C represents the case where the third discharge control circuit is formed by use of a field-effect transistor. The reference character "160Z2" represented in FIG. 3C is a variant example of the first discharge control circuit, described above. In FIG. 3C, the surge suppression capacitor 150 is connected with the series circuit consisting of the driving resistor 146 and the voltage limiting diode 141 that becomes conductive when the application voltage is the same as or higher than the limitation operation voltage Vz, and is connected also in parallel with the series circuit consisting of the equivalent discharging resistor 142*e* and the N-channel-type discharging transistor 148; furthermore, the series circuit consisting of a pair of intermediary driving resistors 246 and 247 and the intermediary transistor 248 is connected with the surge suppression capacitor 150.

The voltage across the driving resistor 146 is applied between the source terminal and the gate terminal of the P-channel-type intermediary transistor 248; the divided voltage γV of the downstream-side intermediary driving resistor 247 is applied between the gate terminal and the source terminal of the discharging transistor 148, by way of the equivalent discharging resistor 142*e*.

When the heat dispersing resistor 242 is connected in series with the drain terminal of the discharging transistor 148, the discharge current Ix can be suppressed from causing heat generation in the discharging transistor 148.

Accordingly, when the charging voltage V of the surge suppression capacitor 150 exceeds the limit voltage [V0=Vz+Vd], which is the addition value of the limitation operation voltage Vz of the voltage limiting diode 141 and the operating voltage Vd of the intermediary transistor 248, the intermediary transistor 248 undergoes circuit-closing driving, so that the divided voltage γV for performing energization drive of the discharging transistor 148 is generated.

As a result, there is generated a feedback voltage [Rx×Ix] that is the multiplication product of a discharge resistance Rx, which is the resistance value of the equivalent discharging resistor 142*e*, and the discharge current Ix that flows in the equivalent discharging resistor 142*e*; then, a discharge current [Ix=(γV−Vd)/Rx] flows in accordance with the equation [γV=Rx×Ix+Vd] in which the voltage obtained by adding the operating voltage Vd of the discharging transistor 148 to the feedback voltage becomes equal to the divided voltage γV; the discharge current Ix is changeable depending on the value of the charging voltage V.

In the case where the respective connection positions of the voltage limiting diode 141 and the driving resistor 146 are exchanged with each other, the P-channel-type transistor and the N-channel-type transistor are replaced by each other and then utilized.

(2) Detailed Description of Effect and Operation

Hereinafter, with regard to the vehicle electronic control apparatus 100A according to Embodiment 1 configured as in FIG. 1, FIG. 2A that represents the first discharge control circuit 160X1 utilizing a junction-type transistor, FIG. 3A that represents the first discharge control circuit 160X2 utilizing a field-effect transistor, FIG. 2B that represents the second discharge control circuit 160Y1 utilizing a junction-type transistor, FIG. 3B that represents the second discharge control circuit 160Y2 utilizing a field-effect transistor, FIG. 2C that represents the third discharge control circuit 160Z1 utilizing a junction-type transistor, and FIG. 3C that represents the third discharge control circuit 160Z2 utilizing a field-effect transistor, the respective effects and operational actions thereof will be explained in detail.

At first, in FIG. 1, when an unillustrated power-source switch is closed, the output contact 102 of the power source relay is closed; in the state where any one of the opening/closing devices 143*i* (i=a, b, c) is opened, a preliminary charging current flows from the inductive load 104*i* (i=a, b, c) connected with the opening/closing device 143*i* into the surge suppression capacitor 150 by way of the discharging diode 144*i* (i=a, b, c); the first preliminary charging resistor 147*a* is connected in series with the charging path. Accordingly, when the resistance value of the first preliminary charging resistor 147*a* is set to be sufficiently larger than the resistance value of the inductive load 104*i*, erroneous operation of the inductive load 104*i* is prevented; through the preliminary charging, the surge suppression capacitor 150 is charged up to the battery voltage Vbb.

Subsequently, in response to various unillustrated input signals, the calculation control circuit unit 130A generates respective drive command signals DRi for the opening/closing devices 143*i*. When at a time when the driving current for any one of the inductive loads 104*i* reaches I0*i*, the drive command signal DRi from the calculation control circuit unit 130A is cancelled, the individual cutoff current I0*i* at a time when the opening/closing device 143*i* is opened circulates through the discharging diode 144*i*, the surge suppression capacitor 150, and the short-circuit prevention diode 149*a*; thus, individual electromagnetic energy Ei that has been accumulated in the inductive load 104*i* is discharged to the surge suppression capacitor 150.

When due to the on/off energization of a single or two or more inductive loads 104i, the charging voltage V of the surge suppression capacitor 150 reaches a predetermined limit voltage V0 in this manner, the initial charging is completed; the charging voltage V of the surge suppression capacitor 150 exceeds the predetermined limit voltage V0; then, the discharge control circuit 160 operates in such a way as to keep the charging voltage V of the surge suppression capacitor 150 at the predetermined limit voltage V0.

The individual cutoff time Tfi in which the individual cutoff current I0i generated after the charging voltage V of the surge suppression capacitor 150 has reached the limit voltage V0 is attenuated to "zero" is calculated by the equation (11) below.

$$Tfi=[(I0i\times R0i)/(V0-Vbb+I0i\times R0i)]\times (L0i/R0i) \quad (11)$$

In this regard, however, because L0i is the inductance of the inductive load 104i, R0i is the internal resistance of the inductive load 104i, and the equation [I0i×R0i≤Vbb] is established, the equation (11) is simplified as represented by the equation (11a) below.

$$Tfi \leq (Vbb/V0) \times (L0i/R0i) \quad (11a)$$

The time constant (L0i/R0i) of the inductive load 104i is, for example, 500 [μsec]; thus, when the boosting ratio (V0/Vbb) is 50/14, the individual cutoff time Tfi becomes 140 [μsec], for example. Provided the number of the same inductive loads 104i provided is 10, the representative on/off period T0 to be calculated by the equation (1) becomes 2.8 [msec] ([T0=2×10×0.14=2.8 [msec] ]; however, in practice, the representative on/off period T0 is the same as or longer than 5 [msec].

Accordingly, because it is only necessary that the electromagnetic energy generated in a short time of, for example, 140 [μsec] is absorbed by the discharge control circuit 160 in a long time of, for example, 5 [msec] or longer, the discharge current Ix is largely suppressed with respect to the cutoff current I0; thus, even when the energy generated and the energy consumed are equal to each other, the maximum power consumption in the discharge control circuit 160 is largely suppressed.

Figure 5:
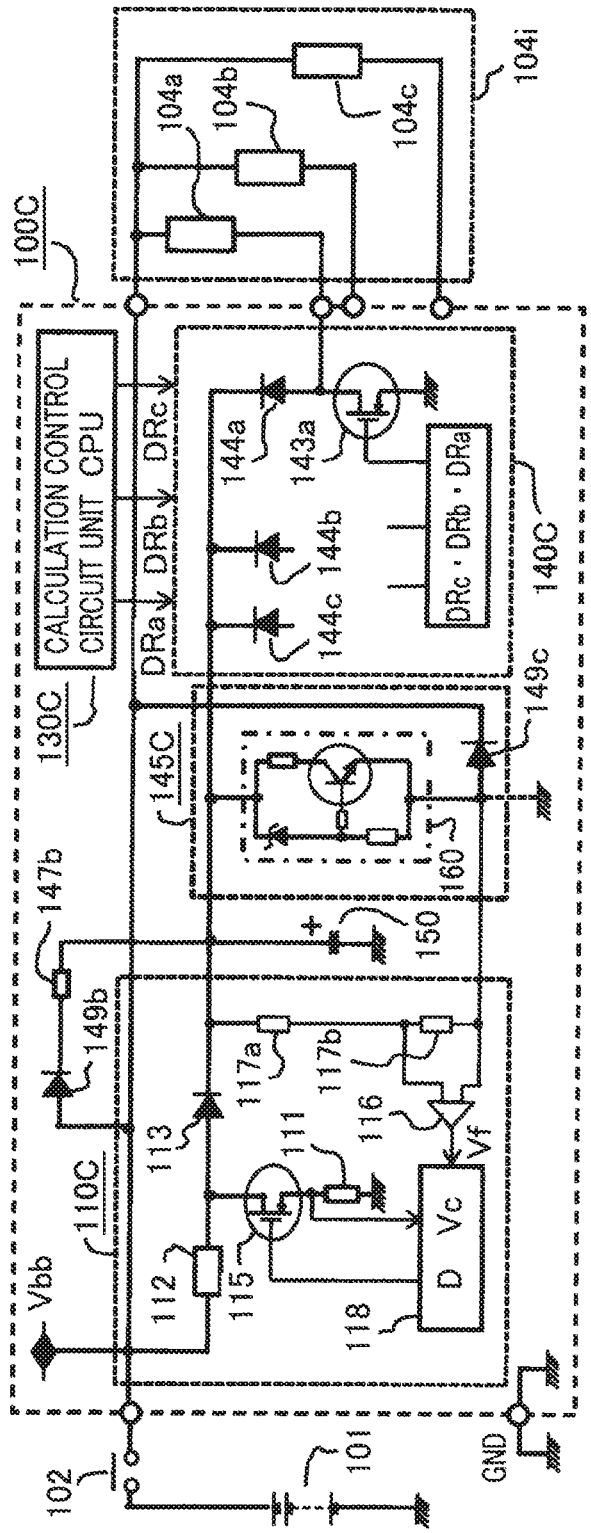
FIG. 5 is a block diagram representing the configuration of a vehicle electronic control apparatus according to Embodiment 3.
Figure 6:
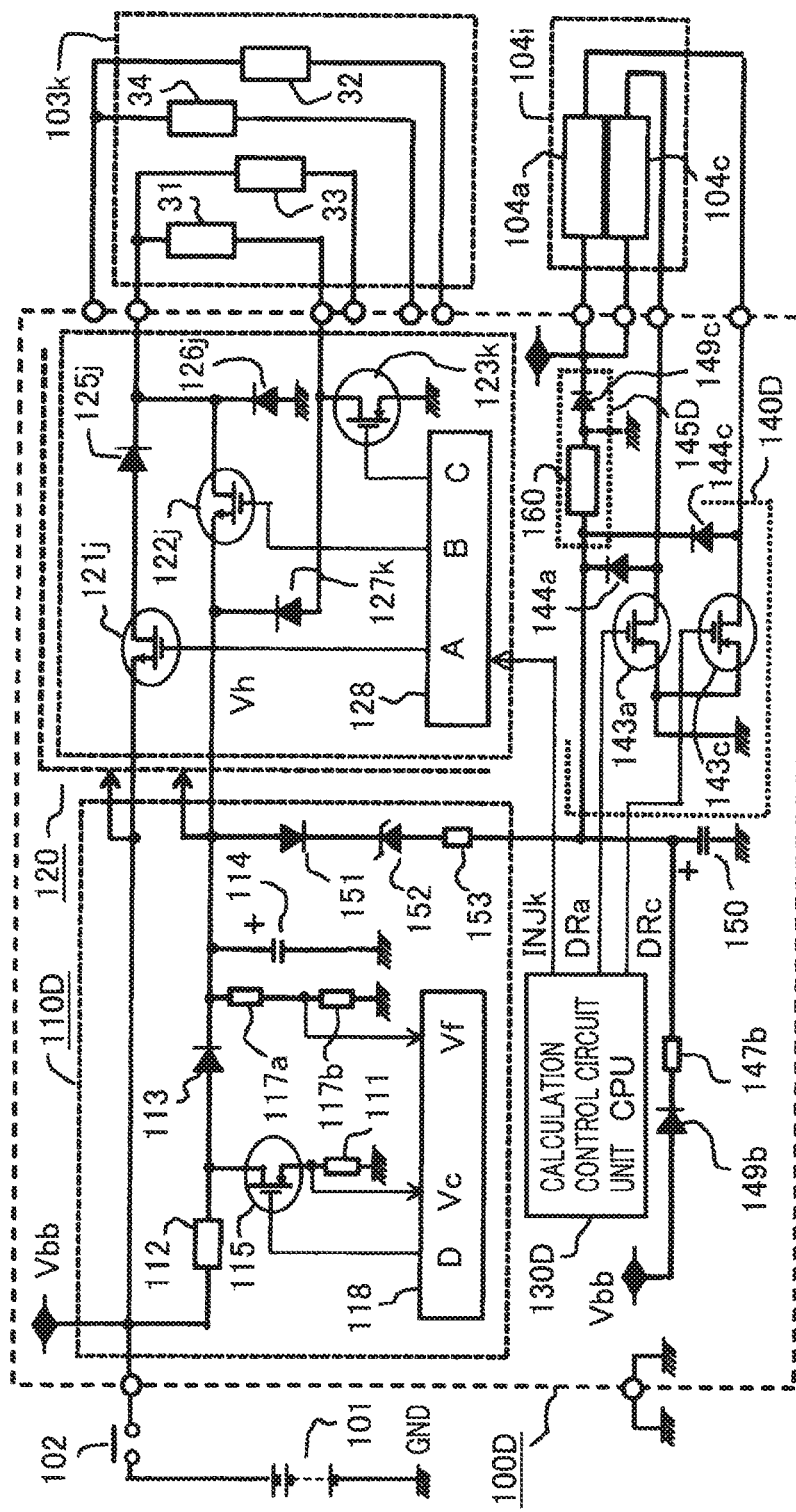
FIG. 6 is a block diagram representing the configuration of a vehicle electronic control apparatus according to Embodiment 4.

In the foregoing explanation, because the initial charging of the surge suppression capacitor 150 is performed through on/off operation of the opening/closing device 143i, the rapid cutoff performance for the inductive load 104i cannot be obtained until the initial charging is completed; however, in the case where there is included an inductive load with which even in a short time after the operation has been started, this is not accepted, there can concurrently be utilized the voltage boosting control circuit units 110A corresponding to any one of the voltage boosting control circuit units 110C and 110D, described later in FIGS. 5 and 6, respectively. When any one of the voltage boosting control circuit units 110C and 110D is utilized, the initial charging can preliminarily be performed in such a way that immediately after the power-source switch is closed, the charging voltage V of the surge suppression capacitor 150 is rapidly raised up to the limit voltage V0.

With regard to the first discharge control circuit 160X1 utilizing a junction-type transistor represented in FIG. 2A and the first discharge control circuit 160X2 utilizing a field-effect transistor represented in FIG. 3A, the second discharge control circuit 160Y1 utilizing a junction-type transistor represented in FIG. 2B and the second discharge control circuit 160Y2 utilizing a field-effect transistor represented in FIG. 3B, and the third discharge control circuit 160Z1 utilizing a junction-type transistor represented in FIG. 2C and the third discharge control circuit 160Z2 utilizing a field-effect transistor represented in FIG. 3C, the individual operation thereof have already been explained; however, in this description, a supplementary explanation for the overall operation will be made.

At first, as the operation common to the respective drawings, the value of the discharge current Ix that flows in the discharging transistor 148 does not depend on the increment voltage [ΔV=V−V0] between the charging voltage V of the surge suppression capacitor 150 and the predetermined limit voltage V0; in the case where ΔV is larger than 0, the discharge current Ix flows; in the case where ΔV is the same as or smaller than 0, the discharge current Ix becomes 0.

In the case of each of the first discharge control circuit 160X1 represented in FIG. 2A and the first discharge control circuit 160X2 represented in FIG. 3A, the discharge current Ix is expressed by an equation [Ix=V/Rx=(V0+ΔV)/Rx≈V0/Rx] in which the discharge current Ix is in inverse proportion to the discharge resistance Rx, and has a constant value under the condition [ΔV<<V0]; however, when the increment voltage ΔV increases, the discharge current Ix also increases so that rapid discharging is performed. As a result, the power consumption in each of the first discharge control circuit 160X1 and the first discharge control circuit 160X2 also increases.

In contrast, in the case of each of the second discharge control circuit 160Y1 represented in FIG. 2B and the second discharge control circuit 160Y2 represented in FIG. 3B, the discharge current Ix is a constant current calculated by an equation [Ix=(Ve−Vd)/Rx] including the intermediary limit voltage Ve of the intermediary voltage limiting diode 241, the operating voltage Vd of the discharging transistor 148, and the discharge resistance Rx, which is the resistance value of the equivalent discharging resistor 142e. Accordingly, although the power consumption in each of the second discharge control circuit 160Y1 and the second discharge control circuit 160Y2 at a time when the charging voltage [V=V0+ΔV] increases is suppressed from increasing, reduction of the increment voltage ΔV cannot be facilitated.

In the case of each of the third discharge control circuit 160Z1 represented in FIG. 2C and the third discharge control circuit 160Z2 represented in FIG. 3C, the discharge current Ix is a variable current calculated by an equation [Ix=(γV−Vd)/Rx] including the divided voltage γV obtained through a pair of the intermediary driving resistors 246 and 247, the operating voltage Vd of the discharging transistor 148, and the discharge resistance Rx, which is the resistance value of the equivalent discharging resistor 142e. Accordingly, when the increment voltage ΔV increases, the discharge current Ix also increases so that rapid discharging is performed; however, due to the increase in the discharge current Ix, the power consumption in each of the third discharge control circuit 160Z1 and the third discharge control circuit 160Z2 also increases. The tendency is more conspicuous than that in the case of each of the first discharge control circuit 160X1 and the first discharge control circuit 160X2.

Meanwhile, almost all of the power consumption in each of the first discharge control circuits 160X1 and 160X2 is born by the discharging resistor 142; however, in the case of each of the second discharge control circuits 160Y1 and 160Y2 or each of the third discharge control circuits 160Z1 and 160Z2, although part of the power consumption is born by the equivalent discharging resistor 142e, the majority of the power consumption is born by the discharging transistor 148. However, when being connected in series with the discharging transistor 148, the heat dispersing resistor 242 can bear the power consumption in the discharging transistor 148.

(3) Gist and Feature of Embodiment 1

As is clear from the foregoing explanation, with regard to claim 1 according to Embodiment 1, A vehicle electronic control apparatus 100A comprising:

an opening/closing device 143$i$ connected in series with a single inductive load or each corresponding one of a plurality of inductive loads 104$i$ to which a battery voltage Vbb is supplied from a vehicle battery 101 mounted in a vehicle; and a rapid cutoff circuit for suppressing a surge voltage generated when the opening/closing device 143$i$ is opened and for rapidly attenuating a driving current for the inductive load 104$i$, wherein the rapid cutoff circuit includes a discharging diode 144$i$ connected with the single inductive load or each corresponding one of the plurality of the inductive loads 104$i$, and a surge suppression capacitor 150 that suppresses an induction voltage generated by the inductive load 104$i$ to a predetermined limit voltage V0 and is shared by the inductive loads 104$i$, wherein the surge suppression capacitor 150 is charged to an initial voltage from which the predetermined limit voltage V0 is obtained, with an initial charging voltage obtained by making any one of the opening/closing devices 143$i$ perform on/off energization of the inductive load 104$i$ or obtained from a voltage boosting control circuit unit 110A, and wherein the rapid cutoff circuit further includes a discharge control circuit 160 that discharges charges charged in the surge suppression capacitor 150, when the value of the charging voltage V of the surge suppression capacitor 150 exceeds the limit voltage V0.

wherein the discharge control circuit 160 includes a voltage limiting diode 141 for setting at least the limit voltage V0, a discharging transistor 148 that applies a discharge current Ix to the discharge control circuit 160 when the charging voltage V of the surge suppression capacitor 150 exceeds the target voltage, and a series resistor that is an equivalent discharging resistor 142$e$ formed of a discharging resistor 142 for limiting the discharge current Ix to a value proportional to the target voltage or a constant current circuit for obtaining the discharge current Ix that is constant for a change in the target voltage, wherein the discharge current Ix is controlled so that the charging voltage V becomes equal to the limit voltage V0, wherein the lower limit of each of individual on/off periods T0$i$, which are the respective individual on/off periods of the opening/closing devices 143$i$, is restricted in such a way as to become the same as or larger than a representative on/off period [T0=ΣTfi×2], which is twice as large as the sum value of individual cutoff times Tfi in each of which the individual opening/closing device 143$i$ is opened and an individual cutoff current I0$i$ flowing in the individual inductive load 104$i$ is attenuated to zero.

With regard to claim 2 according to Embodiment 1, wherein the surge suppression capacitor 150 has an electrostatic capacitance C for which there is performed initial charging in which the charging voltage V becomes the predetermined limit voltage V0, which is a value the same as or more than twice as large as the battery voltage Vbb, by making the opening/closing device 143$i$ perform on/off operation of a representative load or by performing sequential on/off energization of the plurality of opening/closing devices 143$i$, wherein the representative load is a virtual load with which the sum value ΣP0$i$ of individual discharging electric power [P0$i$=E0$i$/T0$i$] obtained by dividing a single individual discharge energy [E0$i$=L0$i$×I0$i^2$/2] calculated from the individual cutoff current I0$i$ of the inductive load 104$i$ and an individual inductance L0$i$ by the individual on/off period T0$i$ becomes equal to the total discharging electric power [P=n×P0], which is a sum value of respective representative discharging electric power amounts [P0=E0/T0] of n representative loads, wherein the cutoff current of the representative load becomes a representative cutoff current I0; the inductance of the representative load becomes a representative inductance L0; the on/off period of the representative load becomes a representative on/off period T0, wherein the representative discharging energy E0 of a piece of the representative load is given by an equation [E0=L0×I0$^2$/2], wherein an initial charge number N for making the representative load perform an initial charging up to the limit voltage V0 is given by an equation [N=(C/L0)×(V0/I0)$^2$], and wherein a representative increment voltage Δ V0 produced by performing a single de-energization of the representative load after completion of the initial charging is given by an equation [ΔV0/V0=√(1+1/N)−1].

As described above, the initial charging of the surge suppression capacitor is performed by on/off operation of a single inductive load or any one of a plurality of inductive loads; in the case of a plurality of inductive loads, when on/off operation of a representative load is performed, the surge suppression capacitor is charged up to a predetermined limit voltage V0 with the initial charge number N represented by the foregoing equation.

Accordingly, the initial charge number N at a time when on/off-driving of an inductive load having a small individual discharging electric power P0$i$ is performed increases in comparison with the initial charge number N according to the foregoing equation; however, because in an application where two or more inductive loads are sequentially and alternately on/off-controlled, the initial charging can be completed in a short time, there is demonstrated a characteristic that initial-charging voltage boosting control circuit is not required and hence an inexpensive configuration is obtained. In the case where the initial charge number N is set to 5 or 10, [ΔV0/V0] becomes 1 or 0.05 from the foregoing equation.

With regard to claim 5 according to Embodiment 1, wherein in a series circuit consisting of the inductive load 104$i$ and the opening/closing device 143$i$, the inductive load 104$i$ is connected at the upstream side of the opening/closing device 143$i$, wherein a parallel circuit consisting of the surge suppression capacitor 150 and the discharge control circuit 160 is connected in parallel with the inductive load 104$i$ by way of a short-circuit prevention diode 149$a$ shared by the discharging diodes 144$i$, wherein the surge suppression capacitor 150 is connected in series with a first preliminary charging resistor 147$a$ that is connected with the battery voltage Vbb by way of the inductive load 104$i$ and the discharging diode 144$i$ from the vehicle battery 101, when any one of the opening/closing devices 143$i$ is opened, wherein because connected in series with the inductive load 104i, the first preliminary charging resistor 147a suppresses a preliminary charging current for the surge suppression capacitor 150 to such an extent that the inductive load 104i does not erroneously operate, and wherein the short-circuit prevention diode 149a prevents the both ends of the first preliminary charging resistor 147a from being connected between the positive-polarity electrode and the negative-polarity electrode of the vehicle battery 101.

As described above, with regard to the preliminary charging resistor connected in series with the inductive load, out of the inductive load and the opening/closing device that are connected in series with each other in such a way that any one thereof is at the upstream side and the other one thereof is at the downstream side, the inductive load is connected in parallel with the surge suppression capacitor; the surge suppression capacitor is connected with the first preliminary charging resistor that is charged to the battery voltage Vbb by the vehicle battery when the opening/closing device is opened.

Therefore, there is demonstrated a characteristic that the period from a time when opening/closing operation by the opening/closing device is started to a time when the charging voltage of the surge suppression capacitor reaches the target limit voltage V0 is shortened, so that the rapid cutoff of the inductive load can be performed and the preliminary charging current can be prevented from making the inductive load erroneously operate.

Moreover, because the surge suppression capacitor is connected in parallel with the inductive load, there is demonstrated a characteristic that when the opening/closing device is opened, the vehicle battery does not hinder the cutoff current from decreasing.

With regard to claim 7 according to Embodiment 1, wherein the discharge control circuit 160 is configured with a first discharge control circuit 160X1, 160X2 formed of a junction-type transistor or a field-effect transistor, wherein the first discharge control circuit 160X1, 160X2 includes
- a series circuit that is connected in parallel with the surge suppression capacitor 150 and consists of the voltage limiting diode 141 and a driving resistor 146,
- a discharging transistor 148 that responds to the voltage across the driving resistor 146, and
- a series circuit that is connected in parallel with the surge suppression capacitor 150 and consists of the discharging transistor 148 and the discharging resistor 146, wherein the discharging transistor 148 is formed of a junction-type transistor in which a base voltage Vbe between the base terminal and the emitter terminal thereof is an operating voltage Vd or a field-effect transistor in which a gate voltage Vg between the gate terminal and the source terminal thereof is the operating voltage Vd, wherein in the case where the driving resistor 146 is connected with a downstream position of the voltage limiting diode 141, an NPN-junction transistor is utilized, as the junction-type transistor, and in the case where the driving resistor 146 is connected with an upstream position of the voltage limiting diode 141, a PNP-junction transistor is utilized, as the junction-type transistor, wherein in the case where the driving resistor 146 is connected with a downstream position of the voltage limiting diode 141, an N-channel field-effect transistor is utilized, as the field-effect transistor, and in the case where the driving resistor 146 is connected with an upstream position of the voltage limiting diode 141, a P-channel field-effect transistor is utilized, as the junction-type transistor, wherein when the charging voltage V of the surge suppression capacitor 150 exceeds the limit voltage [V0=Vz+Vd], which is the addition value of the limitation operation voltage Vz of the voltage limiting diode 141 and the operating voltage Vd, the discharging transistor 148 undergoes circuit-closing driving, so that a discharge current [Ix=V/Rx] inversely proportional to the discharge resistance Rx, which is the resistance value of the discharging resistor 146, flows in the discharging resistor, and when the charging voltage V is lower than the limit voltage [V0=Vz+Vd], the discharging transistor 148 is opened.

As described above, the discharge control circuit connected in parallel with the surge suppression capacitor has a discharging transistor that responds to the voltage across the driving resistor connected in series with the voltage limiting diode; when the discharging transistor is closed, part of charges charged in the surge suppression capacitor are discharged through the discharge resistance Rx; when the charging voltage V of the surge suppression capacitor becomes lower than the limit voltage V0, the discharging transistor is opened and hence the discharging is stopped, so that the increment voltage [ΔV=V−V0] is restored to zero. Thus, there is demonstrated a characteristic that when [ΔV<<V0] is established, the discharge current becomes [Ix=V/Rx=(V0+ΔV)/Rx≈V0/Rx] and discharging with a substantially constant current is performed and that when the two or more opening/closing devices are sequentially opened in a short time and hence the increment voltage ΔV temporarily becomes larger than a normal value, the discharge current Ix increases and hence the normal state can rapidly be restored.

Because in Embodiment 1, the discharging transistor is utilized in a state of being closed or opened, the power consumption therein is small; most of electromagnetic energy discharged by the inductive load due to on/off operation by the opening/closing device is absorbed by the discharging resistor; a high-heat-dispersing mounting structure is applied to the discharging resistor. The same is also applied to Embodiments 2, 3, and 4, described later.

With regard to claim 8 according to Embodiment 1, wherein the discharge control circuit 160 is configured with a second discharge control circuit 160Y1, 160Y2 formed of a junction-type transistor or a field-effect transistor, wherein the second discharge control circuit 160Y1, 160Y2 includes
- a series circuit that is connected in parallel with the surge suppression capacitor and consists of the voltage limiting diode 141 and a driving resistor 146,
- an intermediary transistor 248 that responds to the voltage across the driving resistor 146,
- a series circuit that is connected in parallel with the surge suppression capacitor 150 and consists of an intermediary driving resistor 146, an intermediary voltage limiting diode 241, and the intermediary transistor 248, and
- a series circuit that is connected in parallel with the surge suppression capacitor 150 and consists of the equivalent discharging resistor 142e and the discharging transistor 148, wherein the discharging transistor 148 turns on in response to the value of an intermediary limit voltage Ve of the intermediary voltage limiting diode 241, wherein when the charging voltage V of the surge suppression capacitor 150 exceeds the limit voltage [V0=Vz+

Vd], which is the addition value of the limitation operation voltage Vz of the voltage limiting diode 141 and a driving voltage Vd for the intermediary transistor 248, the intermediary transistor 248 undergoes circuit-closing driving, so that the intermediary voltage limiting diode 241 is energized by way of the intermediary driving resistor 246, and wherein based on [Rx×Ix+Vd=Ve], the discharging transistor 148 performs constant-current discharging with the discharge current Ix in such a way that the addition value [Rx×Ix+Vd] of a feedback voltage [Rx×Ix], which is a multiplication product of the discharging resistance Rx of the equivalent discharging resistor 142e and the discharge current Ix flowing into the discharge resistor, and the operating voltage Vd of the discharging transistor 148 becomes equal to the intermediary limit voltage Ve of the intermediary voltage limiting diode 241.

As described above, the discharge control circuit connected in parallel with the surge suppression capacitor has an intermediary transistor that responds to the voltage across the driving resistor connected in series with the voltage limiting diode; when the intermediary transistor is closed so as to respond to the intermediary limit voltage Ve of the intermediary voltage limiting diode, the discharging transistor 148 performs constant-current control and hence part of charges charged in the surge suppression capacitor are discharged with a constant discharge current; when the charging voltage V of the surge suppression capacitor becomes lower than the limit voltage V0, the intermediary transistor and the discharging transistor are opened and hence the discharging is stopped, so that the increment voltage [ΔV=V−V0] is restored to zero.

Thus, there is demonstrated a characteristic that even when the charging voltage V changes from V0 to (V0+ΔV), the discharge current [Ix=(Ve−Vd)/Rx] produced by the discharging transistor becomes constant regardless of whether or not the increment voltage ΔV changes and that even when the two or more opening/closing devices are sequentially opened in a short time and hence the increment voltage ΔV temporarily becomes larger than a normal value, it is made possible to suppress the power consumption in the discharge control circuit from changing. In Embodiment 1, in order to obtain a predetermined discharge current Ix, the conduction state of the discharging transistor automatically changes and a high-heat-dispersing mounting structure corresponding to the power consumption thereof is utilized, so that it is made possible to largely suppress the power consumption in the equivalent discharging resistor 142e. The type of the transistor to be utilized is an NPN-type or PNP-type junction-type transistor or an N-channel or P-channel field-effect transistor. The same is also applied to Embodiments 2, 3, and 4, described later.

With regard to claim 9 according to Embodiment 1, wherein the discharge control circuit 160 is configured with a third discharge control circuit 160Z1, 160Z2 formed of a junction-type transistor or a field-effect transistor, wherein the third discharge control circuit 160Z1, 160Z2 includes a series circuit that is connected in parallel with the surge suppression capacitor and consists of the voltage limiting diode 141 and a driving resistor 146, an intermediary transistor 248 that responds to the voltage across the driving resistor 146, a series circuit that is connected in parallel with the surge suppression capacitor 150 and consists of a pair of intermediary driving resistors 246 and 247, and the intermediary transistor 248, and a series circuit that is connected in parallel with the surge suppression capacitor 150 and consists of the equivalent discharging resistor 142e and the discharging transistor 148, wherein the discharging transistor 148 turns on in response to a divided voltage γV, of the charging voltage V, that is generated across one of the pair of intermediary driving resistors 246 and 247, wherein when the charging voltage V of the surge suppression capacitor 150 exceeds the limit voltage [V0=Vz+Vd], which is the addition value of the limitation operation voltage Vz of the voltage limiting diode 141 and the driving current Vd for the intermediary transistor 248, the intermediary transistor 248 undergoes circuit-closing driving, so that the divided voltage γV is generated across one of the pair of intermediary driving resistors 246 and 247, and wherein based on an equation [Rx×Ix+Vd=γV], the discharging transistor 148 performs variable-current discharging with the discharge current Ix that changes depending on the value of the charging voltage V, in such a way that the addition value of a feedback voltage [Rx×Ix], which is a multiplication product of the discharging resistance Rx of the equivalent discharging resistor 142e and the discharge current Ix flowing into the discharge resistor, and the operating voltage Vd of the discharging transistor 148 becomes equal to the divided voltage γV.

As described above, the discharge control circuit connected in parallel with the surge suppression capacitor has an intermediary transistor that responds to the voltage across the driving resistor connected in series with the voltage limiting diode; when the intermediary transistor is closed, a pair of intermediary driving resistors generates a divided voltage γV proportional to the charging voltage V of the surge suppression capacitor; the surge suppression capacitor is further connected in parallel with a series circuit consisting of an equivalent discharging resistor Rx and a discharging transistor, and the discharge current [Ix=(γV−Vd)/Rx] corresponding to the operating voltage Vd of the discharging transistor and the value of the divided voltage γV flows in the discharging transistor. Accordingly, part of charges charged in the surge suppression capacitor are discharged; when the charging voltage V of the surge suppression capacitor becomes lower than the limit voltage V0, the intermediary transistor and the discharging transistor are opened and hence the discharging is stopped, so that the increment voltage [ΔV=V−V0] is restored to zero.

Thus, there is demonstrated a characteristic that when [ΔV<<V0] is established, the discharge current becomes [Ix≈(γV0−Vd)/Rx] and discharging with a substantially constant current is performed and that when the two or more opening/closing devices are sequentially opened in a short time and hence the increment voltage ΔV temporarily becomes larger than a normal value, the discharge current Ix increases and hence the normal state can rapidly be restored. In Embodiment 1, in order to obtain a predetermined discharge current Ix, the conduction state of the discharging transistor automatically changes and a high-heat-dispersing mounting structure corresponding to the power consumption thereof is utilized, so that it is made possible to largely suppress the power consumption in the equivalent discharging resistor 142e.

The type of the transistor to be utilized is an NPN-type or PNP-type junction-type transistor or an N-channel or P-channel field-effect transistor.

The same is also applied to Embodiments 2, 3, and 4, described later.

With regard to claim 10 according to Embodiment 1,
wherein the equivalent discharging resistor 142e is connected with the emitter terminal side or the source terminal side of the discharging transistor 148, and a heat dispersing resistor 242 is connected in series with the collector terminal side or the drain terminal side of the discharging transistor 148, and wherein a dispersing resistance Re, which is the resistance value of the heat dispersing resistor 248, is set to be larger than the value of the discharge resistance Rx, which is the resistance value of the equivalent discharging resistor 142e.

As described above, the discharging transistor to be connected in parallel with the surge suppression capacitor is connected in series with the discharge resistance Rx and the dispersing resistance Re.

Accordingly, the voltage across the discharging transistor at a time when the discharge current Ix flows becomes [V−Ix×Rx−Ix×Re], obtained by subtracting the voltage [Ix×Rx] across the discharging resistor and the voltage [Ix×Re] across the dispersing resistor from the charging voltage V of the surge suppression capacitor; thus, there is demonstrated a characteristic that the power consumption in the discharge control circuit is shared by the discharging transistor and the heat dispersing resistor so that the respective heat dispersing structures can be simplified and that the power consumption in the discharging resistor is decreased so that the resistance value is suppressed from changing due to the temperature rise thereof and hence the current control performance of the discharging transistor can be raised. The same is also applied to Embodiments 2, 3, and 4, described later.

Embodiment 2

Figure 4:
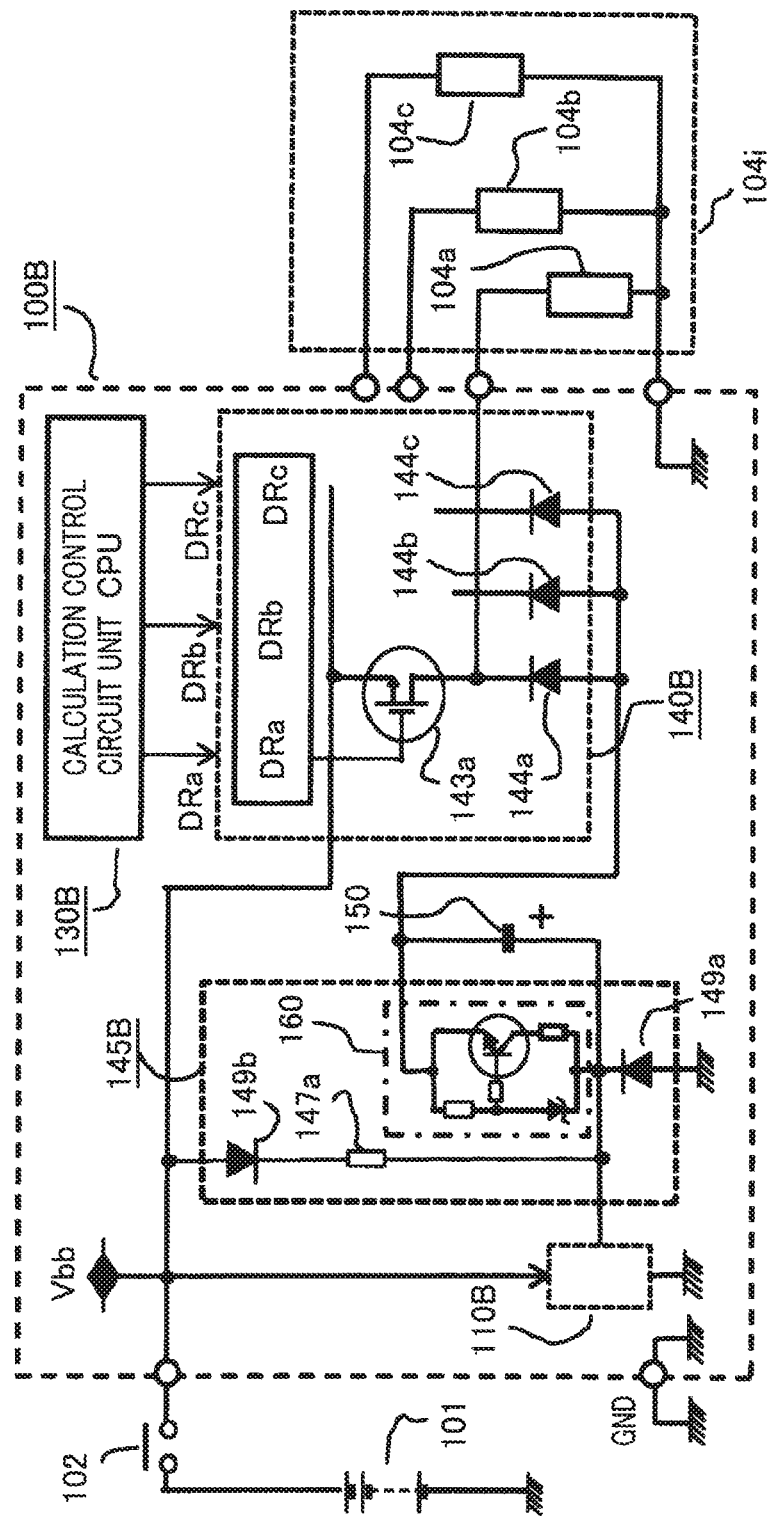
FIG. 4 is a block diagram representing the overall configuration of a vehicle electronic control apparatus according to Embodiment 2.

Next, a vehicle electronic control apparatus according to Embodiment 2 will be explained in detail.
(1) Detailed Description of Configuration FIG. 4 is a block diagram representing the overall configuration of a vehicle electronic control apparatus 100B according to Embodiment 2. In FIG. 4, by way of the output contact 102 of the power source relay and the opening/closing devices 143a, 143b, and 143c (143b and 143c are not illustrated), the battery voltage Vbb of the vehicle battery 101 is applied to the respective upstream ends of two or more inductive loads 104a, 104b, and 104c (in the following explanation, the characters a, b, and c may be represented by "i"). The respective downstream ends of the inductive loads 104a, 104b, and 104c are connected with the ground line GND with which the negative-polarity terminal of the vehicle battery 101 is connected.

The respective downstream ends of the inductive loads 104a, 104b, and 104c are connected with the positive-polarity terminal of the surge suppression capacitor 150 by way of the short-circuit prevention diode 149a. The negative-side terminal of the surge suppression capacitor 150 is connected with the upstream ends of the inductive loads 104a, 104b, and 104c by way of the discharging diodes 144a, 144b, and 144c, respectively.

A discharge control circuit 160, which is the main member of an excessive-charging prevention circuit 145B is connected in parallel with the surge suppression capacitor 150. As the discharge control circuit 160, the first discharge control circuit represented in any one of foregoing FIGS. 2A and 3A, the second discharge control circuit represented in any one of foregoing FIGS. 2B and 3B, or the third discharge control circuit represented in any one of foregoing FIGS. 2C and 3C is utilized.

When any one of the opening/closing devices 143a, 143b (unillustrated), and 143c (unillustrated) is opened, the positive-polarity terminal of the surge suppression capacitor 150 is preliminarily charged with the battery voltage Vbb, via a reverse-flow prevention diode 149b, the first preliminary charging resistor 147a, any one of discharging diodes 144a, 144b, and 144c, and any one of the inductive loads 104a, 104b, and 104c.

A calculation control circuit unit 130B including a microprocessor CPU generates drive command signals DRa, DRb, and DRc for the opening/closing devices 143a, 143b, and 143c, respectively, so as to perform on/off driving control of the opening/closing devices 143a, 143b, and 143c, which are main members of an opening/closing control circuit 140B. The vehicle electronic control apparatus 100B includes the calculation control circuit unit 130B, the opening/closing control circuit 140B, the excessive-charging prevention circuit 145B, and the surge suppression capacitor 150; a voltage boosting control circuit unit 110B that corresponds to a voltage boosting control circuit unit 110C, described later in FIG. 5, may concurrently be utilized.

In the vehicle electronic control apparatus 100B according to Embodiment 2 represented in FIG. 4, the opening/closing devices 143a, 143b, and 143c are connected with the upstream positions of the inductive loads 104a, 104b, and 104c, respectively; in addition to that, the parallel circuit consisting of the excessive-charging prevention circuit 145B and the surge suppression capacitor 150 is connected in parallel with the respective inductive loads 104a, 104b, and 104c, by way of the short-circuit prevention diode 149a and the discharging diodes 144a, 144b, and 144c.
(2) Detailed Description of Effect and Operation Hereinafter, the effect and the operation of the vehicle electronic control apparatus 100B according to Embodiment 2, configured as represented in FIG. 4, will be explained in detail. In FIG. 4, when an unillustrated power-source switch is closed, the output contact 102 of the power source relay is closed; under the condition that any one of the opening/closing devices 143i (i=a, b, c) is opened, the positive-side terminal of the surge suppression capacitor 150 is connected with the vehicle battery 101 by way of the reverse-flow prevention diode 149b and the first preliminary charging resistor 147a; the negative-side terminal of the surge suppression capacitor 150 is connected with the ground line GND by way of the discharging diode 144i and the inductive load 104i; then, the surge suppression capacitor 150 is preliminarily charged by the vehicle battery 101.

Accordingly, when the resistance value of the first preliminary charging resistor 147a is set to be sufficiently larger than the resistance value of the inductive load 104i, erroneous operation of the inductive load 104i is prevented; through the preliminary charging, the surge suppression capacitor 150 is charged up to the battery voltage Vbb.

Subsequently, in response to various unillustrated input signals, the calculation control circuit unit 130B generates respective drive command signals DRi for the opening/closing devices 143i; when at a time when the driving current for any one of the inductive loads 104i reaches I0i, the drive command signal DRi from the calculation control circuit unit 130B is cancelled, the individual cutoff current I0i at a time when the opening/closing device 143i is opened circulates through the short-circuit prevention diode 149a, the surge suppression capacitor 150, and the discharging diode 144i; thus, individual electromagnetic energy Ei that has been accumulated in the inductive load 104i is discharged to the surge suppression capacitor 150.

When due to the on/off energization of a single or two or more inductive loads 104$i$, the charging voltage V of the surge suppression capacitor 150 reaches a predetermined limit voltage V0 in this manner, the initial charging is completed; when the charging voltage V of the surge suppression capacitor 150 exceeds the predetermined limit voltage V0, the discharge control circuit 160 operates in such a way as to keep the charging voltage V of the surge suppression capacitor 150 at the predetermined limit voltage V0.

The individual cutoff time Tfi in which the individual cutoff current I0$i$ generated after the charging voltage V of the surge suppression capacitor 150 has reached the limit voltage V0 is attenuated to "zero" is calculated by the foregoing equation (11) or equation (11a).

In the foregoing explanation, because the initial charging of the surge suppression capacitor 150 is performed through on/off operation of the opening/closing device 143$i$, the rapid cutoff performance for the inductive load 104$i$ cannot be obtained until the initial charging is completed; however, in the case where there is included an inductive load with which even in a short time after the operation has been started, this is not accepted, there can concurrently be utilized the voltage boosting control circuit units 110B corresponding to any one of the voltage boosting control circuit units 110C and 110D, described later in FIGS. 5 and 6, respectively. When any one of the voltage boosting control circuit units 110C and 110D is utilized, the initial charging can preliminarily be performed in such a way that immediately after the power-source switch is closed, the charging voltage V of the surge suppression capacitor 150 is rapidly raised up to the limit voltage V0.

(3) Gist and Feature of Embodiment 2

As is clear from the foregoing explanation, with regard to claim 2 according to Embodiment 1, A vehicle electronic control apparatus 100B comprising:

an opening/closing device 143$i$ connected in series with a single inductive load or each corresponding one of a plurality of inductive loads 104$i$ to which a battery voltage Vbb is supplied from a vehicle battery 101 mounted in a vehicle; and a rapid cutoff circuit for suppressing a surge voltage generated when the opening/closing device 143$i$ is opened and for rapidly attenuating a driving current for the inductive load 104$i$, wherein the rapid cutoff circuit includes a discharging diode 144$i$ connected with the single inductive load or each corresponding one of the plurality of the inductive loads 104$i$, and a surge suppression capacitor 150 that suppresses an induction voltage generated by the inductive load 104$i$ to a predetermined limit voltage V0 and is shared by the inductive loads 104$i$, wherein the surge suppression capacitor 150 is charged to an initial voltage from which the predetermined limit voltage V0 is obtained, with an initial charging voltage obtained by making any one of the opening/closing devices 143$i$ perform on/off energization of the inductive load 104$i$ or obtained from a voltage boosting control circuit unit 110B, and wherein the rapid cutoff circuit further includes a discharge control circuit 160 that discharges charges charged in the surge suppression capacitor 150, when the value of the charging voltage V of the surge suppression capacitor 150 exceeds the limit voltage V0.

wherein the discharge control circuit 160 includes a voltage limiting diode 141 for setting at least the limit voltage V0, a discharging transistor 148 that applies a discharge current Ix to the discharge control circuit 160 when the charging voltage V of the surge suppression capacitor 150 exceeds the target voltage, and a series resistor that is an equivalent discharging resistor 142$e$ formed of a discharging resistor 142 for limiting the discharge current Ix to a value proportional to the target voltage or a constant current circuit for obtaining the discharge current Ix that is constant for a change in the target voltage, wherein the discharge current Ix is controlled so that the charging voltage V becomes equal to the limit voltage V0, wherein the lower limit of each of individual on/off periods T0$i$, which are the respective individual on/off periods of the opening/closing devices 143$i$, is restricted in such a way as to become the same as or larger than a representative on/off period [T0=ΣTfi×2], which is twice as large as the sum value of individual cutoff times Tfi in each of which the individual opening/closing device 143$i$ is opened and an individual cutoff current I0$i$ flowing in the individual inductive load 104$i$ is attenuated to zero.

With regard to claim 2 according to Embodiment 2, wherein the surge suppression capacitor 150 has an electrostatic capacitance C for which there is performed initial charging in which the charging voltage V becomes the predetermined limit voltage V0, which is a value the same as or more than twice as large as the battery voltage Vbb, by making the opening/closing device 143$i$ perform on/off operation of a representative load or by performing sequential on/off energization of the plurality of opening/closing devices 143$i$, wherein the representative load is a virtual load with which the sum value ΣP0$i$ of individual discharging electric power [P0$i$=E0$i$/T0$i$] obtained by dividing a single individual discharge energy [E0$i$=L0$i$×I0$i^2$/2] calculated from the individual cutoff current I0$i$ of the inductive load 104$i$ and an individual inductance L0$i$ by the individual on/off period T0$i$ becomes equal to the total discharging electric power [P=n×P0], which is a sum value of respective representative discharging electric power amounts [P0=E0/T0] of n representative loads, wherein the cutoff current of the representative load becomes a representative cutoff current I0; the inductance of the representative load becomes a representative inductance L0; the on/off period of the representative load becomes a representative on/off period T0, wherein the representative discharging energy E0 of a piece of the representative load is given by an equation [E0=L0×I0$^2$/2], wherein an initial charge number N for making the representative load perform an initial charging up to the limit voltage V0 is given by an equation [N=(C/L0)×(V0/I0)$^2$], and wherein a representative increment voltage Δ V0 produced by performing a single de-energization of the representative load after completion of the initial charging is given by an equation [ΔV0/V0=√(1+1/N)−1].

As described above, the initial charging of the surge suppression capacitor is performed by on/off operation of a single inductive load or any one of a plurality of inductive loads; in the case of a plurality of inductive loads, when on/off operation of a representative load is performed, the surge suppression capacitor is charged up to a predetermined limit voltage V0 with the initial charge number N represented by the foregoing equation.

Accordingly, the initial charge number N at a time when on/off-driving of an inductive load having a small individual discharging electric power P0i is performed increases in comparison with the initial charge number N according to the foregoing equation; however, because in an application where two or more inductive loads are sequentially and alternately on/off-controlled, the initial charging can be completed in a short time, there is demonstrated a characteristic that initial-charging voltage boosting control circuit is not required and hence an inexpensive configuration is obtained.

In the case where the initial charge number N is set to 5 or 10, [ΔV0/V0] becomes 1 or 0.05 from the foregoing equation.

With regard to claim 5 according to Embodiment 2, wherein in a series circuit consisting of the inductive load 104i and the opening/closing device 143i, the opening/closing device 143i is connected at the upstream side of the inductive load 104i, wherein a parallel circuit consisting of the surge suppression capacitor 150 and the discharge control circuit 160 is connected in parallel with the inductive load 104i by way of a short-circuit prevention diode 149a shared by the discharging diodes 144i, wherein the surge suppression capacitor 150 is connected in series with a first preliminary charging resistor 147a that is connected with the battery voltage Vbb by way of the inductive load 104i and the discharging diode 144i from the vehicle battery 101, when any one of the opening/closing devices 143i is opened, wherein because connected in series with the inductive load 104i, the first preliminary charging resistor 147a suppresses a preliminary charging current for the surge suppression capacitor 150 to such an extent that the inductive load 104i does not erroneously operate, and wherein the short-circuit prevention diode 149a prevents the both ends of the first preliminary charging resistor 147a from being connected between the positive-polarity electrode and the negative-polarity electrode of the vehicle battery 101.

As described above, with regard to the preliminary charging resistor connected in series with the inductive load, out of the inductive load and the opening/closing device that are connected in series with each other in such a way that any one thereof is at the upstream side and the other one thereof is at the downstream side, the inductive load is connected in parallel with the surge suppression capacitor; the surge suppression capacitor is connected with the first preliminary charging resistor that is charged to the battery voltage Vbb by the vehicle battery when the opening/closing device is opened.

Therefore, there is demonstrated a characteristic that the period from a time when opening/closing operation by the opening/closing device is started to a time when the charging voltage of the surge suppression capacitor reaches the target limit voltage V0 is shortened, so that the rapid cutoff of the inductive load can be performed and the preliminary charging current can be prevented from making the inductive load erroneously operate.

Moreover, because the surge suppression capacitor is connected in parallel with the inductive load, there is demonstrated a characteristic that when the opening/closing device is opened, the vehicle battery does not hinder the cutoff current from decreasing.

Embodiment 3

Next, a vehicle electronic control apparatus 100C according to Embodiment 3 will be explained in detail.

(1) Detailed Description of Configuration

FIG. 5 is a block diagram representing the configuration of a vehicle electronic control apparatus according to Embodiment 3. In FIG. 5, by way of the output contact 102 of the power source relay, the battery voltage Vbb of the vehicle battery 101 is applied to the respective upstream ends of two or more inductive loads 104a, 104b, and 104c (hereinafter, the characters a, b, and c may be represented by "i"); the downstream ends of the inductive loads 104a, 104b, and 104c are connected with the ground line GND with which the negative-polarity terminal of the vehicle battery 101 is connected, by way of the opening/closing devices 143a, 143b, and 143c (143b and 143c are not represented in FIG. 1), respectively.

The downstream ends of the inductive loads 104a, 104b, and 104c are connected with the positive-polarity terminal of the surge suppression capacitor 150 by way of the discharging diodes 144a, 144b, and 144c, respectively. The negative-polarity terminal of the surge suppression capacitor 150 is connected with the ground line GND. The positive side of the discharge control circuit 160, which is the main member of an excessive-charging prevention circuit 145C, is connected with the positive side of the surge suppression capacitor 150; the negative side of the discharge control circuit 160 is connected with the positive-side power source line, by way of a regeneration diode 149c. As the discharge control circuit 160, the first discharge control circuit represented in any one of foregoing FIGS. 2A and 3A, the second discharge control circuit represented in any one of foregoing FIGS. 2B and 3B, or the third discharge control circuit represented in any one of foregoing FIGS. 2C and 3C is utilized.

The positive-polarity terminal of the surge suppression capacitor 150 is preliminarily charged with the battery voltage Vbb, via the reverse-flow prevention diode 149b, a second preliminary charging resistor 147b, any one of discharging diodes 144a, 144b, and 144c, and any one of the inductive loads 104a, 104b, and 104c; in this situation, in order to prevent a preliminary charging current that flows into the inductive loads 104a, 104b, and 104c from causing the inductive loads to erroneously operate, the second preliminary charging resistor 147b is a current limiting resistor having a sufficiently small value.

A calculation control circuit unit 130C including a microprocessor CPU generates drive command signals DRa, DRb, and DRc for the opening/closing devices 143a, 143b, and 143c, respectively, so as to perform on/off driving control of the opening/closing devices 143a, 143b, and 143c, which are main members of an opening/closing control circuit 140C. The vehicle electronic control apparatus 100C includes the calculation control circuit unit 130C, the opening/closing control circuit 140C, the excessive-charging prevention circuit 145C, and the surge suppression capacitor 150; in Embodiment 3, a voltage boosting control circuit unit 110C is added to the vehicle electronic control apparatus 100C so that initial charging of the surge suppression capacitor 150 is rapidly performed.

A magnetization circuit for an induction device 112 included in the voltage boosting control circuit unit 110C is configured mainly with a series circuit consisting of a voltage boosting opening/closing device 115 and a current detection resistor 111; the magnetization circuit performs self-excited oscillation operation in such a way that when the voltage boosting opening/closing device 115 is closed and then the magnetizing current for the induction device 112 reaches a predetermined upper limit value, the voltage boosting opening/closing device 115 is opened and in such a way that when the magnetizing current is attenuated to a predetermined lower limit value, the voltage boosting opening/closing device 115 is closed again.

A high-voltage induction voltage generated when the voltage boosting opening/closing device 115 is opened is applied to the surge suppression capacitor 150 by way of the charging diode 113; the voltage boosting opening/closing device 115 performs its on/off operation two or more times, so that the charging voltage of the surge suppression capacitor 150 reaches an initial charging voltage, which is an target for the surge suppression capacitor 150. The divided voltage obtained through a series circuit, consisting of voltage dividing resistors 117a and 117b, that is connected in parallel with the discharge control circuit 160 is inputted, as a feedback voltage Vf, to the feedback control circuit 118 by way of a differential amplifier 116.

Based on a current detection voltage Vc obtained through the current detection resistor 111, the feedback control circuit 118 generates an opening/closing command signal D for the voltage boosting opening/closing device 115 so as to perform initial charging of the surge suppression capacitor 150; concurrently, when the feedback voltage Vf that is proportional to the voltage across the discharge control circuit 160 becomes the same as or higher than a setting voltage that is proportional to the target limit voltage V0, the feedback control circuit 118 stops the opening/closing command signal D for the voltage boosting opening/closing device 115. As a result, the initial charging of the surge suppression capacitor 150 is completed.

Accordingly, the actual initial charging voltage of the surge suppression capacitor 150 is set to a voltage obtained by adding the battery voltage Vbb to the limit voltage V0; however, when the initial charging voltage is lower than the addition voltage [V0+Vf], on/off operation of the inductive load 104i supplements power-receiving charges; when due to the supplementation, the voltage across the discharge control circuit 160 exceeds the limit voltage V0, the initial charging by the voltage boosting control circuit unit 110C is completed.

However, due to the on/off operation by the opening/closing device 143i, charging of the surge suppression capacitor 150 is performed, and when the charging voltage V exceeds the limit voltage [V0+Vbb], the discharge current Ix is produced inside the discharge control circuit 160; therefore, the charging voltage V of the surge suppression capacitor 150 is kept at the limit voltage [V0+Vbb].

Meanwhile, the voltage boosting control circuit unit 110A represented by a dotted line in FIG. 1 may be configured in the same manner as the voltage boosting control circuit unit 110C in FIG. 5; however, because in the case of FIG. 1, the surge suppression capacitor 150 is connected in parallel with the discharge control circuit 160, the initial charging voltage thereof is not affected by the battery voltage Vbb and hence it is only necessary to charge the surge suppression capacitor 150 up to the predetermined limit voltage V0. The same can be applied to the voltage boosting control circuit unit 110B represented by a dotted line in FIG. 4; the voltage boosting control circuit unit 110B may be also configured in the same manner as the voltage boosting control circuit unit 110C in FIG. 5.

(2) Detailed Description of Effect and Operation

Next, the effect and the operation of the vehicle electronic control apparatus 100C according to Embodiment 3, configured as represented in FIG. 5, will be explained in detail. In FIG. 5, when an unillustrated power-source switch is closed, the output contact 102 of the power source relay is closed; the surge suppression capacitor 150 is preliminarily charged by way of the reverse-flow prevention diode 149b and the second preliminary charging resistor 147b; then, the charging voltage thereof becomes equal to the battery voltage Vbb.

In this regard, however, when at a time of the preliminary charging, any one of the opening/closing devices 143i (i=a, b, c) is opened, there is produced a preliminary charging current that ramifies from the inductive load 104i connected with the opening/closing device 143i into the surge suppression capacitor 150 by way of the discharging diode 144i; however, because the resistance value of the second preliminary charging resistor 147b is set to a value that is sufficiently smaller than the load resistance of the inductive load 104i, the inductive load 104i does not erroneously operates.

Subsequently, in response to various unillustrated input signals, the calculation control circuit unit 130C generates respective drive command signals DRi for the opening/closing devices 143i; at a time when the driving current for any one of the inductive loads 104i reaches I0i, the drive command signal DRi is cancelled. The individual cutoff current I0i at a time when the opening/closing device 143i is opened circulates through the discharging diode 144i, the surge suppression capacitor 150, and the vehicle battery 101; thus, individual electromagnetic energy Ei that has been accumulated in the inductive load 104i is discharged to the surge suppression capacitor 150.

In this regard, however, in contrast to that in the case of foregoing FIGS. 1 and 4, the surge suppression capacitor 150 is connected in parallel with the inductive loads 104a, 104b, and 104c, the surge suppression capacitor 150 in FIG. 5 is connected in parallel with the opening/closing devices 143a, 143b, and 143c. Accordingly, in the case of FIG. 5, the vehicle battery 101 is connected in series with the current attenuation circuit for the inductive load 104i in a direction in which the attenuation of the current is hindered; therefore, a rapid cutoff characteristic the same as that in each of FIGS. 1 and 4 cannot be obtained, unless the charging voltage V of the surge suppression capacitor 150 is set to a value [V=V0+Vbb] obtained by adding the battery voltage Vbb to the limit voltage V0.

In contrast, the negative side of the discharge control circuit 160 is connected with the vehicle battery 101 by way of the regeneration diode 149c; therefore, the voltage to be applied across the discharge control circuit 160 is decreased to [V−Vbb=V0], and hence the power consumption in the discharge control circuit 160 can be suppressed. In other words, in the case where in FIG. 5, the regeneration circuit formed of the regeneration diode 149c is removed and, as represented by a dotted line, the negative side of the discharge control circuit 160 is connected with the ground line GND, the voltage to be applied to the discharge control circuit 160 becomes [V0+Vbb] and hence the power consumption therein increases.

When in such a way as described above, the voltage boosting control circuit unit 110C makes the charging voltage V of the surge suppression capacitor 150 reach the addition voltage [V0+Vbb] obtained by adding the battery voltage Vbb to the limit voltage V0, the initial charging is completed; when the charging voltage V of the surge suppression capacitor 150 exceeds the addition voltage [V0+Vbb], the discharge control circuit 160 operates to keep the charging voltage V of the surge suppression capacitor 150 at the addition voltage [V0+Vbb].

As a result, in the case where the discharge control circuit 160 is connected with the positive-side power source line by way of the regeneration diode 149c, it is only necessary to perform control in such a way that when the voltage across the discharge control circuit 160 exceeds the limit voltage V0, discharging is started and in such a way that when the voltage across the discharge control circuit 160 is lower than the limit voltage V0, the discharging is stopped.

In the case where the surge suppression capacitor 150 is connected in parallel with the discharge control circuit 160 in FIG. 5, it is only necessary that the initial charging voltage thereof is the same as or lower than the limit voltage V0; however, in this case, it is required that in order to prevent a high-frequency initial charging current from leaking to the outside, a noise filter is provided.

(3) Gist and Feature of Embodiment 3

As is clear from the foregoing explanation, with regard to claim 3 according to Embodiment 1, A vehicle electronic control apparatus 100C comprising:
an opening/closing device 143i connected in series with a single inductive load or each corresponding one of a plurality of inductive loads 104i to which a battery voltage Vbb is supplied from a vehicle battery 101 mounted in a vehicle; and
a rapid cutoff circuit for suppressing a surge voltage generated when the opening/closing device 143i is opened and for rapidly attenuating a driving current for the inductive load 104i,
wherein the rapid cutoff circuit includes
a discharging diode 144i connected with the single inductive load or each corresponding one of the plurality of the inductive loads 104i, and
a surge suppression capacitor 150 that suppresses an induction voltage generated by the inductive load 104i to a predetermined limit voltage V0 and is shared by the inductive loads 104i,
wherein the surge suppression capacitor 150 is charged to an initial voltage from which the predetermined limit voltage V0 is obtained, with an initial charging voltage obtained by making any one of the opening/closing devices 143i perform on/off energization of the inductive load 104i or obtained from a voltage boosting control circuit unit 110C, and
wherein the rapid cutoff circuit further includes a discharge control circuit 160 that discharges charges charged in the surge suppression capacitor 150, when the value of a target voltage [V−Vbb] obtained by subtracting the battery voltage Vbb from charging voltage V of the surge suppression capacitor 150 exceeds the limit voltage V0.
wherein the discharge control circuit 160 includes
a voltage limiting diode 141 for setting at least the limit voltage V0,
a discharging transistor 148 that applies a discharge current Ix to the discharge control circuit 160 when the charging voltage V of the surge suppression capacitor 150 exceeds the target voltage, and
a series resistor that is an equivalent discharging resistor 142e formed of a discharging resistor 142 for limiting the discharge current Ix to a value proportional to the target voltage or a constant current circuit for obtaining the discharge current Ix that is constant for a change in the target voltage,
wherein the charging voltage V becomes an addition voltage [V0+Vbb] obtained by adding the battery voltage Vbb to the limit voltage V0, and
wherein the lower limit of each of individual on/off periods T0i, which are the respective individual on/off periods of the opening/closing devices 143i, is restricted in such a way as to become the same as or larger than a representative on/off period [T0=ΣTfix2], which is twice as large as the sum value of individual cutoff times Tfi in each of which the individual opening/closing device 143i is opened and an individual cutoff current I0i flowing in the individual inductive load 104i is attenuated to zero.

With regard to claim 3 according to Embodiment 3,
wherein the surge suppression capacitor 150 is connected with the voltage boosting control circuit unit 110C for performing initial charging at a time when operation of the vehicle is started,
wherein the voltage boosting control circuit unit 110C includes
an induction device 112 to be connected with the vehicle battery 101,
a charging diode 113 that charges the surge suppression capacitor 150 with an induction voltage generated by the induction device 112, in response to on/off operation of a voltage boosting opening/closing device 115, and
a feedback control circuit 118 that controls the opening/closing operation of the voltage boosting opening/closing device 115 so that the charging voltage V of the surge suppression capacitor 150 becomes the same as or lower than the addition voltage [V0+Vbb] obtained by adding the battery voltage Vbb to the limit voltage V0, and
wherein the vehicle battery 101 is connected in series with the path of the initial charging or the vehicle battery 101 exists in a current attenuation circuit for the inductive load 104i at a time when the opening/closing device 143i is opened.

As described above, the surge suppression capacitor is preliminarily charged with a boosted voltage generated by the voltage boosting control circuit; the charging voltage thereof is the same as or lower than the addition value of the limit voltage V0 and the battery voltage Vbb.

Accordingly, because it is made possible that in accordance with the initial charging path, the charging voltage of the surge suppression capacitor 150 can preliminarily be raised up to the limit voltage V0 or the addition voltage [V0+Vbb] immediately after the operation is started, there is demonstrated a characteristic that immediately after the operation is started, there occurs a state where the inductive load can rapidly be performed.

The same is also applied to Embodiments 2 and 3, described above; however, in the case of Embodiments 2 and 3, the charging voltage V may be set to be the same as or lower than the limit voltage V0.

With regard to claim 6 according to Embodiment 3,
wherein the inductive load 104i is connected in series with an upstream position of the opening/closing device 143i,
wherein the positive-side terminal of the surge suppression capacitor 150 is connected with the downstream terminal of the inductive load 143i by way of the discharging diode 144i,
wherein the negative-side terminal of the surge suppression capacitor 150 is connected with the ground line GND connected with the negative-polarity terminal of the vehicle battery 101,
wherein the discharge control circuit 160 is connected in parallel with the surge suppression capacitor 150 or the negative-side terminal thereof is connected with the positive-polarity power source line of the vehicle battery 101 by way of a regeneration diode 149c,
wherein the surge suppression capacitor 150 is charged up to the battery voltage Vbb by way of a reverse-flow prevention diode 149*b* and a second preliminary charging resistor 147*b* from the vehicle battery 101, wherein the second preliminary charging resistor 147*b* is a current limiting resistor that suppresses a ramification current flowing into the surge suppression capacitor 150 by way of the inductive load 104*i* and the discharging diode 144*i* when the opening/closing device 143*i* is opened, and wherein the reverse-flow prevention diode 149*b* prevents charges charged in the surge suppression capacitor 150 from flowing into the vehicle battery 101.

As described above, in the vehicle electronic control apparatus in which the inductive load and the opening/closing device are connected in series with each other in such a way that the inductive load is at the upstream side and the opening/closing device is at the downstream side and in which the surge suppression capacitor is connected in parallel with the opening/closing device, there is provided a preliminary charging circuit that charges the surge suppression capacitor up to the battery voltage Vbb by way of the reverse-flow prevention diode and the second preliminary charging resistor from the vehicle battery.

Therefore, there is demonstrated a characteristic that the period from a time when opening/closing operation by the opening/closing device is started to a time when the charging voltage of the surge suppression capacitor reaches the target limit voltage V0 is shortened, so that the rapid cutoff of the inductive load can be performed.

In Embodiment 3, because the surge suppression capacitor is connected in parallel with the opening/closing device, the vehicle battery acts in such a way as to hinder the attenuation of the cutoff current, when the opening/closing device is opened; thus, in contrast to the case where the surge suppression capacitor is connected in parallel with the inductive load, the same cutoff performance cannot be obtained unless the battery voltage Vbb is added to the value of the limit voltage V0. However, in the case where the negative side of the excessive-charging prevention circuit is connected with the positive-side power source line through the regeneration diode, there is demonstrated a characteristic that the operating voltage of the voltage limiting diode in the discharge control circuit may not be changed but be the predetermined limit voltage V0 and that because the negative side of the surge suppression capacitor is connected with the ground line, the initial charging circuit in the voltage boosting control circuit unit is simplified.

Embodiment 4

Next, a vehicle electronic control apparatus according to Embodiment 4 will be explained in detail.

(1) Detailed Description of Configuration

FIG. 6 is a block diagram representing the configuration of a vehicle electronic control apparatus 100D according to Embodiment 4. In FIG. 6, the respective configurations and connection relationships of a calculation control circuit unit 130D, an opening/closing control circuit 140D, an excessive-charging prevention circuit 145D, the second preliminary charging resistor 147*b*, the reverse-flow prevention diode 149*b*, the surge suppression capacitor 150, and the discharge control circuit 160 included in the vehicle electronic control apparatus 100D are the same as those in FIG. 5. The inductive load 104*i* at the upstream side and the opening/closing device 143*i* at the downstream side are connected in series with each other; the surge suppression capacitor 150 is connected in parallel with the opening/closing device 143*i*; the discharge control circuit 160 is connected with the positive-side power source line by way of the regeneration diode 149*c*. Similarly, as the discharge control circuit 160, the first discharge control circuit represented in any one of foregoing FIGS. 2A and 3A, the second discharge control circuit represented in any one of foregoing FIGS. 2B and 3B, or the third discharge control circuit represented in any one of foregoing FIGS. 2C and 3C is utilized.

However, in contrast to the case in FIG. 5, instead of the voltage boosting control circuit unit 110C, the voltage boosting control circuit unit 110D is utilized; the voltage boosting control circuit unit 110D performs rapid power supply and rapid cutoff for a fuel-injection electromagnetic coil 103*k* of a multi-cylinder engine, by way of a driving control circuit unit 120.

The voltage boosting control circuit unit 110C charges the surge suppression capacitor 150 in FIG. 5 to the addition voltage [V0+Vbb]; for example, V0 is 50 [V], Vbb is 12 [V], and the addition voltage is 62 [V]. In contrast, the voltage boosting control circuit unit 110D in FIG. 6 generates a high voltage Vh of, for example, DC 70 [V]; by way of a voltage reducing circuit of, for example, DC 8 [V], the surge suppression capacitor 150 in FIG. 6 is initially charged with the high voltage Vh generated by the voltage boosting control circuit unit 110D to a subtraction voltage of 62 [V].

A magnetization circuit for an induction device 112 included in the voltage boosting control circuit unit 110D is configured mainly with a series circuit consisting of the voltage boosting opening/closing device 115 and the current detection resistor 111; the magnetization circuit performs self-excited oscillation operation in such a way that when the voltage boosting opening/closing device 115 is closed and then the magnetizing current for the induction device 112 reaches a predetermined upper limit value, the voltage boosting opening/closing device 115 is opened and in such a way that when the magnetizing current is attenuated to a predetermined lower limit value, the voltage boosting opening/closing device 115 is closed again.

A high-voltage induction voltage generated when the voltage boosting opening/closing device 115 is opened is applied to a high-voltage capacitor 114 by way of the charging diode 113; when the voltage boosting opening/closing device 115 performs its on/off operation two or more times and hence the charging voltage of the high-voltage capacitor reaches the high voltage Vh, which is a target for the high-voltage capacitor, the voltage dividing resistors 117*a* and 117*b* detect the high voltage Vh and the feedback control circuit 118 keeps the high voltage Vh.

The high-voltage capacitor 114 is charged up to the high voltage Vh that exceeds the limit voltage V0 for the surge suppression capacitor 150.

In other words, based on a current detection voltage Vc obtained through the current detection resistor 111, the feedback control circuit 118 generates an opening/closing command signal D for the voltage boosting opening/closing device 115 so as to perform high-voltage charging of the high-voltage capacitor 114; concurrently, when the feedback voltage Vf that is proportional to the voltage across the high-voltage capacitor 114 becomes the same as or higher than a setting voltage that is proportional to the target high voltage Vh, the feedback control circuit 118 stops the opening/closing command signal D for the voltage boosting opening/closing device 115. As a result, feedback control is performed in such a way that the high voltage Vh for the high-voltage capacitor 114 becomes a fixed value.

The fuel-injection electromagnetic coil 103*k* is provided with electromagnetic coils 31, 32, 33, and 34 for the respective cylinders in which fuel injection is sequentially performed; a pair of the driving control circuit units 120 performs rapid power supply and rapid cutoff of these electromagnetic coils 31, 32, 33, and 34. The rapid magnetization opening/closing device 122*j* included in the driving control circuit unit 120 applies the high voltage Vh to the electromagnetic coil 31 or the electromagnetic coil 33; a rapid cutoff opening/closing device 123*k* connected to the downstream position of each electromagnetic coil performs selection between the electromagnetic coil 31 and the electromagnetic coil 33; a commutation circuit device 126*j* is provided at the upstream position of the electromagnetic coils 31 and 33.

A power-supply maintaining opening/closing device 121*j* applies the battery voltage Vbb to the electromagnetic coil 31 or the electromagnetic coil 33 by way of the reverse-flow prevention device 125*j*; the connection point between each of the electromagnetic coils 31, 32, 33, and 34 and the rapid cutoff opening/closing device 123*k* is connected with the positive-side terminal of the high-voltage capacitor 114 by way of the discharging diode 127*k*. The character [j=1 or 2] is the number for identifying each of the cylinders; the character [k=1, 2, 3, 4] denotes the cylinder number and the order of fuel injection.

When the calculation control circuit unit 130D generates the fuel injection command INJk (k=1, 2, 3, 4), a gate control circuit 128 generates a circuit-closing start command signal B for the rapid magnetization opening/closing device 122*j* for a corresponding cylinder; concurrently, the gate control circuit 128 generates a circuit-closing command signal A for the power-supply maintaining opening/closing device 121*j* of the same cylinder and a circuit-closing command signal C for the rapid cutoff opening/closing device 123*k* having the corresponding cylinder number.

When an unillustrated current detection circuit detects the fact that the magnetizing current for the corresponding-number electromagnetic coil 31, 32, 33, or 34 has increased up to a predetermined rapid magnetization current, the rapid magnetization opening/closing device 122*j* is opened and hence the magnetizing current is attenuated in a commutation manner by way of the commutation circuit device 126*j*; after that, duty control is performed through the on/off control of the power-supply maintaining opening/closing device 121*j* so that a predetermined opened-valve holding current is obtained; when in due course of time, the fuel injection command INJk is stopped and hence the rapid cutoff opening/closing device 123*k* is opened, regenerative charging of the high-voltage capacitor 114 with the electromagnetic energy in the electromagnetic coil that has been energized is performed by way of the discharging diode 127*k*; then, the power-supply maintaining opening/closing device 121*j* is opened.

In a step-down circuit from the high-voltage capacitor 114 to the surge suppression capacitor 150, a reverse-flow prevention diode 151 for safety and an initial charging diode 152, which is a voltage limiting diode of, for example, DC 8 [v], or an initial charging resistor 153.

In the case where there are utilized control constants with which the difference between the high voltage Vh, which is a charging voltage of the high-voltage capacitor 114, and the charging voltage V required by the surge suppression capacitor 150, i.e., in Embodiment 4, the difference between the high voltage Vh and the addition voltage [V−V0+Vbb] obtained by adding the limit voltage V0 to the battery voltage Vbb is small, the initial charging diode 152 is not required. The initial charging resistor 153 is provided in order to give priority to the voltage rise in the high-voltage capacitor 114 in a process where the respective voltages of the high-voltage capacitor 114 and the surge suppression capacitor 150 rise.

(2) Detailed Description of Effect and Operation

Next, the effect and the operation of the vehicle electronic control apparatus 100D according to Embodiment 4, configured as represented in FIG. 6, will be explained in detail. In FIG. 6, when an unillustrated power-source switch is closed, the output contact 102 of the power source relay is closed; the surge suppression capacitor 150 is preliminarily charged by way of the reverse-flow prevention diode 149*b* and the second preliminary charging resistor 147*b*; then, the charging voltage thereof becomes equal to the battery voltage Vbb.

In this regard, however, when at a time of the preliminary charging, any one of the opening/closing devices 143*i* (i=a, b, c) is opened, there is produced a preliminary charging current that ramifies from the inductive load 104*i* connected with the opening/closing device 143*i* into the surge suppression capacitor 150 by way of the discharging diode 144*i*; however, because the resistance value of the second preliminary charging resistor 147*b* is set to a value that is sufficiently smaller than the load resistance of the inductive load 104*i*, the inductive load 104*i* does not erroneously operates.

Meanwhile, the voltage boosting control circuit unit 110D performs high-voltage charging of the high-voltage capacitor 114 through on/off energization of the induction device 112 by the voltage boosting opening/closing device 115; rapid power supply and rapid cutoff for the fuel-injection electromagnetic coil 103*k* are performed by way of a pair of the driving control circuit units 120. The surge suppression capacitor 150 is preliminarily charged by way of the initial charging diode 152 and the initial charging resistor 153 included in the voltage reducing circuit; the charging voltage V thereof is a value obtained by adding a voltage, corresponding to the battery voltage Vbb, to the target limit voltage V0.

Subsequently, in response to various unillustrated input signals, the calculation control circuit unit 130D generates respective drive command signals DRi for the opening/closing devices 143*i*; when at a time when the driving current for any one of the inductive loads 104*i* reaches I0*i*, the drive command signal DRi is cancelled, the individual cutoff current I0*i* at a time when the opening/closing device 143*i* is opened circulates through the discharging diode 144*i*, the surge suppression capacitor 150, and the vehicle battery 101; thus, individual electromagnetic energy Ei that has been accumulated in the inductive load 104*i* is discharged to the surge suppression capacitor 150.

In this regard, however, in contrast to the fact that in the case of foregoing FIGS. 1 and 4, the surge suppression capacitor 150 is connected in parallel with the inductive loads 104*a*, 104*b*, and 104*c*, the surge suppression capacitor 150 in FIG. 6 is connected in parallel with the opening/closing devices 143*a*, 143*b*, and 143*c*. Accordingly, the vehicle battery 101 is connected in series with the current attenuation circuit for the inductive load 104*i* in a direction in which the attenuation of the current is hindered; therefore, the same rapid cutoff characteristic cannot be obtained, unless the charging voltage V of the surge suppression capacitor 150 is set to a value [V=V0+Vbb] obtained by adding the battery voltage Vbb to the limit voltage V0.

In contrast, the negative side of the discharge control circuit 160 is connected with the vehicle battery 101 by way of the regeneration diode 149*c*; therefore, the voltage to be applied across the discharge control circuit 160 is decreased to [V−Vbb=V0], and hence the power consumption in the discharge control circuit 160 can be suppressed. In other words, in the case where in FIG. 6, the regeneration circuit formed of the regeneration diode 149c is removed and, as represented by a dotted line, the negative side of the discharge control circuit 160 is connected with the ground line GND, the voltage to be applied to the discharge control circuit 160 becomes [V0+Vbb] and hence the power consumption therein increases.

When in such a way as described above, the voltage boosting control circuit unit 110D makes the charging voltage V of the surge suppression capacitor 150 reach the addition voltage [V0+Vbb] obtained by adding the battery voltage Vbb to the limit voltage V0, the initial charging is completed; when the charging voltage V of the surge suppression capacitor 150 exceeds the addition voltage [V0+Vbb], the discharge control circuit 160 operates to keep the charging voltage V of the surge suppression capacitor 150 at the addition voltage [V0+Vbb]. As a result, in the case where the discharge control circuit 160 is connected with the positive-side power source line by way of the regeneration diode 149c, it is only necessary to perform control in such a way that when the voltage across the discharge control circuit 160 exceeds the limit voltage V0, discharging is started and in such a way that when the voltage across the discharge control circuit 160 is lower than the limit voltage V0, the discharging is stopped.

In the case where the surge suppression capacitor 150 is connected in parallel with the discharge control circuit 160 in FIG. 6, it is only necessary that the initial charging voltage thereof is the same as or lower than the limit voltage V0; however, in this case, it is required that in order to prevent a high-frequency initial charging current from leaking to the outside, a noise filter is provided. Accordingly, the respective effects and operational actions of the opening/closing control circuit 140D and the excessive-charging prevention circuit 145D are the same as those in FIG. 5.

(3) Gist and Feature of Embodiment 4

As is clear from the foregoing explanation, with regard to claim 1 according to Embodiment 4, A vehicle electronic control apparatus 100D comprising:
an opening/closing device 143i connected in series with a single inductive load or each corresponding one of a plurality of inductive loads 104i to which a battery voltage Vbb is supplied from a vehicle battery 101 mounted in a vehicle; and
a rapid cutoff circuit for suppressing a surge voltage generated when the opening/closing device 143i is opened and for rapidly attenuating a driving current for the inductive load 104i,
wherein the rapid cutoff circuit includes
a discharging diode 144i connected with the single inductive load or each corresponding one of the plurality of the inductive loads 104i, and
a surge suppression capacitor 150 that suppresses an induction voltage generated by the inductive load 104i to a predetermined limit voltage V0 and is shared by the inductive loads 104i,
wherein the surge suppression capacitor 150 is charged to an initial voltage from which the predetermined limit voltage V0 is obtained, with an initial charging voltage obtained by making any one of the opening/closing devices 143i perform on/off energization of the inductive load 104i or obtained from a voltage boosting control circuit unit 110D, and
wherein the rapid cutoff circuit further includes a discharge control circuit 160 that discharges charges charged in the surge suppression capacitor 150, when the charging voltage V of the surge suppression capacitor 150 or the value of a target voltage [V−Vbb] obtained by subtracting the battery voltage Vbb from the charging voltage V exceeds the limit voltage V0.

Wherein the discharge control circuit 160 includes
a voltage limiting diode 141 for setting at least the limit voltage V0,
a discharging transistor 148 that applies a discharge current Ix to the discharge control circuit 160 when the charging voltage V of the surge suppression capacitor 150 exceeds the target voltage, and
a series resistor that is an equivalent discharging resistor 142e formed of a discharging resistor 142 for limiting the discharge current Ix to a value proportional to the target voltage or a constant current circuit for obtaining the discharge current Ix that is constant for a change in the target voltage,
wherein the charging voltage V becomes an addition voltage [V0+Vbb] obtained by adding the battery voltage Vbb to the limit voltage V0, and
wherein the lower limit of each of individual on/off periods T0i, which are the respective individual on/off periods of the opening/closing devices 143i, is restricted in such a way as to become the same as or larger than a representative on/off period [T0=ΣTfi×2], which is twice as large as the sum value of individual cutoff times Tfi in each of which the individual opening/closing device 143i is opened and an individual cutoff current I0i flowing in the individual inductive load 104i is attenuated to zero.

With regard to claim 4 according to Embodiment 4,
wherein the surge suppression capacitor 150 is connected with the voltage boosting control circuit unit 110D for performing initial charging at a time when operation of the vehicle is started,
wherein the voltage boosting control circuit unit 110D includes
an induction device 112 to be connected with the vehicle battery 101,
a high-voltage capacitor 114 that is charged by way of a charging diode 113 up to a high voltage Vh the same as or higher than the limit voltage V0 with an induction voltage generated by the induction device 112, in response to on/off operation of a voltage boosting opening/closing device 115, and
a feedback control circuit 118 that controls the opening/closing operation of the voltage boosting opening/closing device 115 so that the charging voltage of the high-voltage capacitor 114 becomes the same as or lower than the high voltage Vh for fuel injection in the vehicle,
wherein the high-voltage capacitor 114 performs rapid power supply to a fuel-injection electromagnetic coil 103k by way of a driving control circuit unit 120,
wherein there is provided a voltage reducing circuit including an initial charging diode 152 or an initial charging resistor 153 for performing initial charging of the surge suppression capacitor 150, and
wherein the voltage reducing circuit suppresses the initial charging voltage of the surge suppression capacitor 150 to be the same as or lower than the addition voltage [V0+Vbb] obtained by adding the battery voltage Vbb to the limit voltage V0.

As described above, the surge suppression capacitor is initially charged by way of the voltage reducing circuit from a high voltage generated by the voltage boosting control circuit unit for performing fuel injection control; the charging voltage thereof becomes a value the same as or lower than the addition voltage of the limit voltage V0 and the battery voltage Vbb.

Accordingly, because it is made possible that by use of the initial charging path, the charging voltage of the surge suppression capacitor can preliminarily be raised up to the limit voltage V0 or the addition voltage [V0+Vbb] immediately after the operation is started, there is demonstrated a characteristic that rapid cutoff of the inductive load can be performed immediately after the operation is started and that because the voltage boosting control circuit unit is utilized also for fuel injection control, an inexpensive initial charging circuit can be formed.

With regard to claim 6 according to Embodiment 4,
wherein the inductive load 104*i* is connected in series with an upstream position of the opening/closing device 143*i*,
wherein the positive-side terminal of the surge suppression capacitor 150 is connected with the downstream terminal of the inductive load 143*i* by way of the discharging diode 144*i*,
wherein the negative-side terminal of the surge suppression capacitor 150 is connected with the ground line GND connected with the negative-polarity terminal of the vehicle battery 101,
wherein the discharge control circuit 160 is connected in parallel with the surge suppression capacitor 150 or the negative-side terminal thereof is connected with the positive-polarity power source line of the vehicle battery 101 by way of a regeneration diode 149*c*,
wherein the surge suppression capacitor 150 is charged up to the battery voltage Vbb by way of a reverse-flow prevention diode 149*b* and a second preliminary charging resistor 147*b* from the vehicle battery 101,
wherein the second preliminary charging resistor 147*b* is a current limiting resistor that suppresses a ramification current flowing into the surge suppression capacitor 150 by way of the inductive load 104*i* and the discharging diode 144*i* when the opening/closing device 143*i* is opened, and
wherein the reverse-flow prevention diode 149*b* prevents charges charged in the surge suppression capacitor 150 from flowing into the vehicle battery 101.

As described above, in the vehicle electronic control apparatus in which the inductive load and the opening/closing device are connected in series with each other in such a way that the inductive load is at the upstream side and the opening/closing device is at the downstream side and in which the surge suppression capacitor is connected in parallel with the opening/closing device, there is provided a preliminary charging circuit that charges the surge suppression capacitor up to the battery voltage Vbb by way of the reverse-flow prevention diode and the second preliminary charging resistor from the vehicle battery.

Therefore, there is demonstrated a characteristic that the period from a time when opening/closing operation by the opening/closing device is started to a time when the charging voltage of the surge suppression capacitor reaches the target limit voltage V0 is shortened, so that the rapid cutoff of the inductive load can be performed.

In Embodiment 4, because the surge suppression capacitor is connected in parallel with the opening/closing device, the vehicle battery acts in such a way as to hinder the attenuation of the cutoff current, when the opening/closing device is opened; thus, in contrast to the case where the surge suppression capacitor is connected in parallel with the inductive load, the same cutoff performance cannot be obtained unless the battery voltage Vbb is added to the value of the limit voltage V0. However, in the case where the negative side of the excessive-charging prevention circuit is connected with the positive-side power source line through the regeneration diode, there is demonstrated a characteristic that the operating voltage of the voltage limiting diode in the discharge control circuit may not be changed but be the predetermined limit voltage V0 and that because the negative side of the surge suppression capacitor is connected with the ground line, the initial charging circuit in the voltage boosting control circuit unit is simplified.

Although the present application is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:
1. A vehicle electronic control apparatus comprising:
an opening/closing device connected in series with a single inductive load or each corresponding one of a plurality of inductive loads to which a battery voltage Vbb is supplied from a vehicle battery mounted in a vehicle; and
a rapid cutoff circuit for suppressing a surge voltage generated when the opening/closing device is opened and for rapidly attenuating a driving current for the inductive load,
wherein the rapid cutoff circuit includes
a discharging diode connected with the single inductive load or each corresponding one of the plurality of the inductive loads, and
a surge suppression capacitor that suppresses an induction voltage generated by the inductive load to a predetermined limit voltage V0 and is shared by the inductive loads,
wherein the surge suppression capacitor is charged to an initial voltage from which the predetermined limit voltage V0 is obtained, with an initial charging voltage obtained by making any one of the opening/closing devices perform on/off energization of the inductive load or obtained from a voltage boosting control circuit,
wherein the rapid cutoff circuit further includes a discharge control circuit that discharges charges charged in the surge suppression capacitor, when the charging voltage V of the surge suppression capacitor or the value of a target voltage [V−Vbb] obtained by subtracting the battery voltage Vbb from the charging voltage V exceeds the limit voltage V0,
wherein the discharge control circuit includes
a voltage limiting diode for setting at least the limit voltage V0,
a discharging transistor that applies a discharge current Ix to the discharge control circuit when the charging voltage V of the surge suppression capacitor exceeds the target voltage, and a series resistor that is an equivalent discharging resistor formed of a discharging resistor for limiting the discharge current Ix to a value proportional to the target voltage or a constant current circuit for obtaining the discharge current Ix that is constant for a change in the target voltage, wherein in the case where the vehicle battery exists in a charging path of an initial charging or in an energization path of the discharge current Ix, the charging voltage V becomes an addition voltage [V0+Vbb] obtained by adding the battery voltage Vbb to the limit voltage V0, and in the case where the vehicle battery exists neither in the charging path nor in the energization path, the discharge current Ix is controlled so that the charging voltage V becomes equal to the limit voltage V0, wherein the lower limit of each of individual on/off periods T0$i$, which are the respective individual on/off periods of the opening/closing devices, is restricted in such a way as to become the same as or larger than a representative on/off period [T0=ΣTfi×2], which is twice as large as the sum value of individual cutoff times Tfi in each of which the individual opening/closing device is opened and an individual cutoff current I0$i$ flowing in the individual inductive load is attenuated to zero.

2. The vehicle electronic control apparatus according to claim 1, wherein the surge suppression capacitor has an electrostatic capacitance C for which there is performed initial charging in which the charging voltage V becomes the predetermined limit voltage V0, which is a value the same as or more than twice as large as the battery voltage Vbb, by making the opening/closing device perform on/off operation of a representative load or by performing sequential on/off energization of the plurality of opening/closing devices, wherein the representative load is a virtual load with which the sum value EP0$i$ of individual discharging electric power [P0$i$=E0$i$/T0$i$] obtained by dividing a single individual discharge energy [E0$i$=L0$i$×I0$i^2$/2] calculated from the individual cutoff current I0$i$ of the inductive load and an individual inductance L0$i$ by the individual on/off period T0$i$ becomes equal to the total discharging electric power [P=n×P0], which is a sum value of respective representative discharging electric power amounts [P0=E0/T0] of n representative loads, wherein the cutoff current of the representative load becomes a representative cutoff current I0; the inductance of the representative load becomes a representative inductance L0; the on/off period of the representative load becomes a representative on/off period T0, wherein the representative discharging energy E0 of a piece of the representative load is given by an equation [E0=L0×I0$^2$/2], wherein an initial charge number N for making the representative load perform an initial charging up to the limit voltage V0 is given by an equation [N=(C/L0)×(V0/I0)$^2$], and wherein a representative increment voltage ΔV0 produced by performing a single de-energization of the representative load after completion of the initial charging is given by an equation [ΔV0/V0=$\sqrt{(1+1/N)}$−1].

3. The vehicle electronic control apparatus according to claim 2, wherein in a series circuit consisting of the inductive load and the opening/closing device, any one of thereof is connected at the upstream side of the other one thereof, wherein a parallel circuit consisting of the surge suppression capacitor and the discharge control circuit is connected in parallel with the inductive load by way of a short-circuit prevention diode shared by the discharging diodes, wherein the surge suppression capacitor is connected in series with a first preliminary charging resistor that is connected with the battery voltage Vbb by way of the inductive load and the discharging diode from the vehicle battery, when any one of the opening/closing devices is opened, wherein because connected in series with the inductive load, the first preliminary charging resistor suppresses a preliminary charging current for the surge suppression capacitor to such an extent that the inductive load does not erroneously operate, and wherein the short-circuit prevention diode prevents the both ends of the first preliminary charging resistor from being connected between the positive-polarity electrode and the negative-polarity electrode of the vehicle battery.

4. The vehicle electronic control apparatus according to claim 2, wherein the inductive load is connected in series with an upstream position of the opening/closing device, wherein the positive-side terminal of the surge suppression capacitor is connected with the downstream terminal of the inductive load by way of the discharging diode, wherein the negative-side terminal of the surge suppression capacitor is connected with the ground line GND connected with the negative-polarity terminal of the vehicle battery, wherein the discharge control circuit is connected in parallel with the surge suppression capacitor or the negative-side terminal thereof is connected with the positive-polarity power source line of the vehicle battery by way of a regeneration diode, wherein the surge suppression capacitor is charged up to the battery voltage Vbb by way of a reverse-flow prevention diode and a second preliminary charging resistor from the vehicle battery, wherein the second preliminary charging resistor is a current limiting resistor that suppresses a ramification current flowing into the surge suppression capacitor by way of the inductive load and the discharging diode when the opening/closing device is opened, and wherein the reverse-flow prevention diode prevents charges charged in the surge suppression capacitor from flowing into the vehicle battery.

5. The vehicle electronic control apparatus according to claim 2, wherein the discharge control circuit is configured with a first discharge control circuit formed of a junction-type transistor or a field-effect transistor, wherein the first discharge control circuit includes
a series circuit that is connected in parallel with the surge suppression capacitor and consists of the voltage limiting diode and a driving resistor,
a discharging transistor that responds to the voltage across the driving resistor, and
a series circuit that is connected in parallel with the surge suppression capacitor and consists of the discharging transistor and the discharging resistor, wherein the discharging transistor is formed of a junction-type transistor in which a base voltage Vbe between the base terminal and the emitter terminal thereof is an operating voltage Vd or a field-effect transistor in which a gate voltage Vg between the gate terminal and the source terminal thereof is the operating voltage Vd, wherein in the case where the driving resistor is connected with a downstream position of the voltage limiting diode, an NPN-junction transistor is utilized, as the junction-type transistor, and in the case where the driving resistor is connected with an upstream position of the voltage limiting diode, a PNP-junction transistor is utilized, as the junction-type transistor, wherein in the case where the driving resistor is connected with a downstream position of the voltage limiting diode, an N-channel field-effect transistor is utilized, as the field-effect transistor, and wherein in the case where the driving resistor is connected with an upstream position of the voltage limiting diode, a P-channel field-effect transistor is utilized, as the field-effect transistor, and wherein when the charging voltage V of the surge suppression capacitor exceeds the limit voltage [V0=Vz+Vd], which is the addition value of a limitation operation voltage Vz of the voltage limiting diode and the operating voltage Vd, the discharging transistor undergoes circuit-closing driving, so that a discharge current [Ix=V/Rx] inversely proportional to a discharge resistance Rx, which is the resistance value of the discharging resistor, flows in the discharging resistor, and when the charging voltage V is lower than the limit voltage [V0=Vz+Vd], the discharging transistor is opened.

6. The vehicle electronic control apparatus according to claim 2, wherein the discharge control circuit is configured with a second discharge control circuit formed of a junction-type transistor or a field-effect transistor, wherein the second discharge control circuit includes
a series circuit that is connected in parallel with the surge suppression capacitor and consists of the voltage limiting diode and a driving resistor,
an intermediary transistor that responds to the voltage across the driving resistor,
a series circuit that is connected in parallel with the surge suppression capacitor and consists of an intermediary driving resistor, an intermediary voltage limiting diode, and the intermediary transistor, and
a series circuit that is connected in parallel with the surge suppression capacitor and consists of the equivalent discharging resistor and the discharging transistor, wherein the discharging transistor turns on in response to the value of an intermediary limit voltage Ve of the intermediary voltage limiting diode, wherein when the charging voltage V of the surge suppression capacitor exceeds the limit voltage [V0=Vz+Vd], which is the addition value of the limitation operation voltage Vz of the voltage limiting diode and a driving voltage Vd for the intermediary transistor, the intermediary transistor undergoes circuit-closing driving, so that the intermediary voltage limiting diode is energized by way of the intermediary driving resistor, and wherein based on [Rx×Ix+Vd=Ve], the discharging transistor performs constant-current discharging with the discharge current Ix in such a way that the addition value [Rx×Ix+Vd] of a feedback voltage [Rx×Ix], which is a multiplication product of the discharging resistance Rx of the equivalent discharging resistor and the discharge current Ix flowing into the discharge resistor, and the operating voltage Vd of the discharging transistor becomes equal to the intermediary limit voltage Ve of the intermediary voltage limiting diode.

7. The vehicle electronic control apparatus according to claim 2, wherein the discharge control circuit is configured with a third discharge control circuit formed of a junction-type transistor or a field-effect transistor, wherein the third discharge control circuit includes
a series circuit that is connected in parallel with the surge suppression capacitor and consists of the voltage limiting diode and a driving resistor,
an intermediary transistor that responds to the voltage across the driving resistor,
a series circuit that is connected in parallel with the surge suppression capacitor and consists of a pair of intermediary driving resistors and the intermediary transistor that are connected in series with one another, and
a series circuit that is connected in parallel with the surge suppression capacitor and consists of the equivalent discharging resistor and the discharging transistor, wherein the discharging transistor turns on in response to a divided voltage γV, of the charging voltage V, that is generated across one of the pair of intermediary driving resistors, wherein when the charging voltage V of the surge suppression capacitor exceeds the limit voltage [V0=Vz+Vd], which is the addition value of the limitation operation voltage Vz of the voltage limiting diode and the driving voltage Vd for the intermediary transistor, the intermediary transistor undergoes circuit-closing driving, so that the divided voltage γV is generated across one of the pair of intermediary driving resistors, and wherein based on an equation [Rx×Ix+Vd=γV], the discharging transistor performs variable-current discharging with the discharge current Ix that changes depending on the value of the charging voltage V, in such a way that the addition value of a feedback voltage [Rx×Ix], which is a multiplication product of the discharging resistance Rx of the equivalent discharging resistor and the discharge current Ix flowing into the discharge resistor, and the operating voltage Vd of the discharging transistor becomes equal to the divided voltage γV.

8. The vehicle electronic control apparatus according to claim 1, wherein the surge suppression capacitor is connected with the voltage boosting control circuit for performing initial charging at a time when operation of the vehicle is started, wherein the voltage boosting control circuit includes
an induction device to be connected with the vehicle battery,
a charging diode that charges the surge suppression capacitor with an induction voltage generated by the induction device, in response to on/off operation of a voltage boosting opening/closing device, and
a feedback control circuit that controls the opening/closing operation of the voltage boosting opening/closing device so that the charging voltage V of the surge suppression capacitor becomes the same as or lower than the addition voltage [V0+Vbb] obtained by adding the battery voltage Vbb to the limit voltage V0, and wherein the vehicle battery is connected in series with the path of the initial charging or the vehicle battery exists in a current attenuation circuit for the inductive load at a time when the opening/closing device is opened.

9. The vehicle electronic control apparatus according to claim 8, wherein in a series circuit consisting of the inductive load and the opening/closing device, any one of thereof is connected at the upstream side of the other one thereof, wherein a parallel circuit consisting of the surge suppression capacitor and the discharge control circuit is connected in parallel with the inductive load by way of a short-circuit prevention diode shared by the discharging diodes, wherein the surge suppression capacitor is connected in series with a first preliminary charging resistor that is connected with the battery voltage Vbb by way of the inductive load and the discharging diode from the vehicle battery, when any one of the opening/closing devices is opened, wherein because connected in series with the inductive load, the first preliminary charging resistor suppresses a preliminary charging current for the surge suppression capacitor to such an extent that the inductive load does not erroneously operate, and wherein the short-circuit prevention diode prevents the both ends of the first preliminary charging resistor from being connected between the positive-polarity electrode and the negative-polarity electrode of the vehicle battery.

10. The vehicle electronic control apparatus according to claim 8, wherein the inductive load is connected in series with an upstream position of the opening/closing device, wherein the positive-side terminal of the surge suppression capacitor is connected with the downstream terminal of the inductive load by way of the discharging diode, wherein the negative-side terminal of the surge suppression capacitor is connected with the ground line GND connected with the negative-polarity terminal of the vehicle battery, wherein the discharge control circuit is connected in parallel with the surge suppression capacitor or the negative-side terminal thereof is connected with the positive-polarity power source line of the vehicle battery by way of a regeneration diode, wherein the surge suppression capacitor is charged up to the battery voltage Vbb by way of a reverse-flow prevention diode and a second preliminary charging resistor from the vehicle battery, wherein the second preliminary charging resistor is a current limiting resistor that suppresses a ramification current flowing into the surge suppression capacitor by way of the inductive load and the discharging diode when the opening/closing device is opened, and wherein the reverse-flow prevention diode prevents charges charged in the surge suppression capacitor from flowing into the vehicle battery.

11. The vehicle electronic control apparatus according to claim 8, wherein the discharge control circuit is configured with a first discharge control circuit formed of a junction-type transistor or a field-effect transistor, wherein the first discharge control circuit includes
a series circuit that is connected in parallel with the surge suppression capacitor and consists of the voltage limiting diode and a driving resistor,
a discharging transistor that responds to the voltage across the driving resistor, and
a series circuit that is connected in parallel with the surge suppression capacitor and consists of the discharging transistor and the discharging resistor, wherein the discharging transistor is formed of a junction-type transistor in which a base voltage Vbe between the base terminal and the emitter terminal thereof is an operating voltage Vd or a field-effect transistor in which a gate voltage Vg between the gate terminal and the source terminal thereof is the operating voltage Vd, wherein in the case where the driving resistor is connected with a downstream position of the voltage limiting diode, an NPN-junction transistor is utilized, as the junction-type transistor, and in the case where the driving resistor is connected with an upstream position of the voltage limiting diode, a PNP-junction transistor is utilized, as the junction-type transistor, wherein in the case where the driving resistor is connected with a downstream position of the voltage limiting diode, an N-channel field-effect transistor is utilized, as the field-effect transistor, and wherein in the case where the driving resistor is connected with an upstream position of the voltage limiting diode, a P-channel field-effect transistor is utilized, as the field-effect transistor, and wherein when the charging voltage V of the surge suppression capacitor exceeds the limit voltage [V0=Vz+Vd], which is the addition value of a limitation operation voltage Vz of the voltage limiting diode and the operating voltage Vd, the discharging transistor undergoes circuit-closing driving, so that a discharge current [Ix=V/Rx] inversely proportional to a discharge resistance Rx, which is the resistance value of the discharging resistor, flows in the discharging resistor, and when the charging voltage V is lower than the limit voltage [V0=Vz+Vd], the discharging transistor is opened.

12. The vehicle electronic control apparatus according to claim 8, wherein the discharge control circuit is configured with a second discharge control circuit formed of a junction-type transistor or a field-effect transistor, wherein the second discharge control circuit includes
a series circuit that is connected in parallel with the surge suppression capacitor and consists of the voltage limiting diode and a driving resistor,
an intermediary transistor that responds to the voltage across the driving resistor,
a series circuit that is connected in parallel with the surge suppression capacitor and consists of an intermediary driving resistor, an intermediary voltage limiting diode, and the intermediary transistor, and
a series circuit that is connected in parallel with the surge suppression capacitor and consists of the equivalent discharging resistor and the discharging transistor, wherein the discharging transistor turns on in response to the value of an intermediary limit voltage Ve of the intermediary voltage limiting diode, wherein when the charging voltage V of the surge suppression capacitor exceeds the limit voltage [V0=Vz+Vd], which is the addition value of the limitation operation voltage Vz of the voltage limiting diode and a driving voltage Vd for the intermediary transistor, the intermediary transistor undergoes circuit-closing driving, so that the intermediary voltage limiting diode is energized by way of the intermediary driving resistor, and wherein based on [Rx×Ix+Vd=Ve], the discharging transistor performs constant-current discharging with the discharge current Ix in such a way that the addition value [Rx×Ix+Vd] of a feedback voltage [Rx×Ix], which is a multiplication product of the discharging resistance Rx of the equivalent discharging resistor and the discharge current Ix flowing into the discharge resistor, and the operating voltage Vd of the discharging transistor becomes equal to the intermediary limit voltage Ve of the intermediary voltage limiting diode.

13. The vehicle electronic control apparatus according to claim 8, wherein the discharge control circuit is configured with a third discharge control circuit formed of a junction-type transistor or a field-effect transistor, wherein the third discharge control circuit includes
a series circuit that is connected in parallel with the surge suppression capacitor and consists of the voltage limiting diode and a driving resistor,
an intermediary transistor that responds to the voltage across the driving resistor,
a series circuit that is connected in parallel with the surge suppression capacitor and consists of a pair of intermediary driving resistors and the intermediary transistor that are connected in series with one another, and
a series circuit that is connected in parallel with the surge suppression capacitor and consists of the equivalent discharging resistor and the discharging transistor, wherein the discharging transistor turns on in response to a divided voltage γV, of the charging voltage V, that is generated across one of the pair of intermediary driving resistors, wherein when the charging voltage V of the surge suppression capacitor exceeds the limit voltage [V0=Vz+Vd], which is the addition value of the limitation operation voltage Vz of the voltage limiting diode and the driving voltage Vd for the intermediary transistor, the intermediary transistor undergoes circuit-closing driving, so that the divided voltage γV is generated across one of the pair of intermediary driving resistors, and wherein based on an equation [Rx×Ix+Vd=γV], the discharging transistor performs variable-current discharging with the discharge current Ix that changes depending on the value of the charging voltage V, in such a way that the addition value of a feedback voltage [Rx×Ix], which is a multiplication product of the discharging resistance Rx of the equivalent discharging resistor and the discharge current Ix flowing into the discharge resistor, and the operating voltage Vd of the discharging transistor becomes equal to the divided voltage γV.

14. The vehicle electronic control apparatus according to claim 1, wherein the surge suppression capacitor is connected with the voltage boosting control circuit for performing initial charging at a time when operation of the vehicle is started, wherein the voltage boosting control circuit includes
an induction device to be connected with the vehicle battery,
a high-voltage capacitor that is charged by way of a charging diode up to a high voltage Vh the same as or higher than the limit voltage V0 with an induction voltage generated by the induction device, in response to on/off operation of a voltage boosting opening/closing device, and
a feedback control circuit that controls the opening/closing operation of the voltage boosting opening/closing device so that the charging voltage of the high-voltage capacitor becomes the same as or lower than the high voltage Vh for fuel injection in the vehicle, and wherein the high-voltage capacitor performs rapid power supply to a fuel-injection electromagnetic coil by way of a driving control circuit, wherein there is provided a voltage reducing circuit including an initial charging diode or an initial charging resistor for performing initial charging of the surge suppression capacitor, and wherein the voltage reducing circuit suppresses the initial charging voltage of the surge suppression capacitor to be the same as or lower than the addition voltage [V0+Vbb] obtained by adding the battery voltage Vbb to the limit voltage V0.

15. The vehicle electronic control apparatus according to claim 1, wherein in a series circuit consisting of the inductive load and the opening/closing device, any one of thereof is connected at the upstream side of the other one thereof, wherein a parallel circuit consisting of the surge suppression capacitor and the discharge control circuit is connected in parallel with the inductive load by way of a short-circuit prevention diode shared by the discharging diodes, wherein the surge suppression capacitor is connected in series with a first preliminary charging resistor that is connected with the battery voltage Vbb by way of the inductive load and the discharging diode from the vehicle battery, when any one of the opening/closing devices is opened, wherein because connected in series with the inductive load, the first preliminary charging resistor suppresses a preliminary charging current for the surge suppression capacitor to such an extent that the inductive load does not erroneously operate, and wherein the short-circuit prevention diode prevents the both ends of the first preliminary charging resistor from being connected between the positive-polarity electrode and the negative-polarity electrode of the vehicle battery.

16. The vehicle electronic control apparatus according to claim 1, wherein the inductive load is connected in series with an upstream position of the opening/closing device, wherein the positive-side terminal of the surge suppression capacitor is connected with the downstream terminal of the inductive load by way of the discharging diode, wherein the negative-side terminal of the surge suppression capacitor is connected with the ground line GND connected with the negative-polarity terminal of the vehicle battery, wherein the discharge control circuit is connected in parallel with the surge suppression capacitor or the negative-side terminal thereof is connected with the positive-polarity power source line of the vehicle battery by way of a regeneration diode, wherein the surge suppression capacitor is charged up to the battery voltage Vbb by way of a reverse-flow prevention diode and a second preliminary charging resistor from the vehicle battery, wherein the second preliminary charging resistor is a current limiting resistor that suppresses a ramification current flowing into the surge suppression capacitor by way of the inductive load and the discharging diode when the opening/closing device is opened, and wherein the reverse-flow prevention diode prevents charges charged in the surge suppression capacitor from flowing into the vehicle battery.

17. The vehicle electronic control apparatus according to claim 1, wherein the discharge control circuit is configured with a first discharge control circuit formed of a junction-type transistor or a field-effect transistor, wherein the first discharge control circuit includes
a series circuit that is connected in parallel with the surge suppression capacitor and consists of the voltage limiting diode and a driving resistor,
a discharging transistor that responds to the voltage across the driving resistor, and
a series circuit that is connected in parallel with the surge suppression capacitor and consists of the discharging transistor and the discharging resistor, wherein the discharging transistor is formed of a junction-type transistor in which a base voltage Vbe between the base terminal and the emitter terminal thereof is an operating voltage Vd or a field-effect transistor in which a gate voltage Vg between the gate terminal and the source terminal thereof is the operating voltage Vd, wherein in the case where the driving resistor is connected with a downstream position of the voltage limiting diode, an NPN-junction transistor is utilized, as the junction-type transistor, and in the case where the driving resistor is connected with an upstream position of the voltage limiting diode, a PNP-junction transistor is utilized, as the junction-type transistor, wherein in the case where the driving resistor is connected with a downstream position of the voltage limiting diode, an N-channel field-effect transistor is utilized, as the field-effect transistor, and wherein in the case where the driving resistor is connected with an upstream position of the voltage limiting diode, a P-channel field-effect transistor is utilized, as the field-effect transistor, and wherein when the charging voltage V of the surge suppression capacitor exceeds the limit voltage [V0=Vz+Vd], which is the addition value of a limitation operation voltage Vz of the voltage limiting diode and the operating voltage Vd, the discharging transistor undergoes circuit-closing driving, so that a discharge current [Ix=V/Rx] inversely proportional to a discharge resistance Rx, which is the resistance value of the discharging resistor, flows in the discharging resistor, and when the charging voltage V is lower than the limit voltage [V0=Vz+Vd], the discharging transistor is opened.

18. The vehicle electronic control apparatus according to claim 1, wherein the discharge control circuit is configured with a third discharge control circuit formed of a junction-type transistor or a field-effect transistor, wherein the third discharge control circuit includes
a series circuit that is connected in parallel with the surge suppression capacitor and consists of the voltage limiting diode and a driving resistor,
an intermediary transistor that responds to the voltage across the driving resistor,
a series circuit that is connected in parallel with the surge suppression capacitor and consists of a pair of intermediary driving resistors and the intermediary transistor that are connected in series with one another, and
a series circuit that is connected in parallel with the surge suppression capacitor and consists of the equivalent discharging resistor and the discharging transistor, wherein the discharging transistor turns on in response to a divided voltage γV, of the charging voltage V, that is generated across one of the pair of intermediary driving resistors, wherein when the charging voltage V of the surge suppression capacitor exceeds the limit voltage [V0=Vz+Vd], which is the addition value of the limitation operation voltage Vz of the voltage limiting diode and the driving voltage Vd for the intermediary transistor, the intermediary transistor undergoes circuit-closing driving, so that the divided voltage γV is generated across one of the pair of intermediary driving resistors, and wherein based on an equation [Rx×Ix+Vd=γV], the discharging transistor performs variable-current discharging with the discharge current Ix that changes depending on the value of the charging voltage V, in such a way that the addition value of a feedback voltage [Rx×Ix], which is a multiplication product of the discharging resistance Rx of the equivalent discharging resistor and the discharge current Ix flowing into the discharge resistor, and the operating voltage Vd of the discharging transistor becomes equal to the divided voltage γV.

19. The vehicle electronic control apparatus according to claim 1, wherein the discharge control circuit is configured with a second discharge control circuit formed of a junction-type transistor or a field-effect transistor, wherein the second discharge control circuit includes
a series circuit that is connected in parallel with the surge suppression capacitor and consists of the voltage limiting diode and a driving resistor,
an intermediary transistor that responds to the voltage across the driving resistor,
a series circuit that is connected in parallel with the surge suppression capacitor and consists of an intermediary driving resistor, an intermediary voltage limiting diode, and the intermediary transistor, and
a series circuit that is connected in parallel with the surge suppression capacitor and consists of the equivalent discharging resistor and the discharging transistor, wherein the discharging transistor turns on in response to the value of an intermediary limit voltage Ve of the intermediary voltage limiting diode, wherein when the charging voltage V of the surge suppression capacitor exceeds the limit voltage [V0=Vz+Vd], which is the addition value of the limitation operation voltage Vz of the voltage limiting diode and a driving voltage Vd for the intermediary transistor, the intermediary transistor undergoes circuit-closing driving, so that the intermediary voltage limiting diode is energized by way of the intermediary driving resistor, and wherein based on [Rx×Ix+Vd=Ve], the discharging transistor performs constant-current discharging with the discharge current Ix in such a way that the addition value [Rx×Ix+Vd] of a feedback voltage [Rx×Ix], which is a multiplication product of the discharging resistance Rx of the equivalent discharging resistor and the discharge current Ix flowing into the discharge resistor, and the operating voltage Vd of the discharging transistor becomes equal to the intermediary limit voltage Ve of the intermediary voltage limiting diode.

20. The vehicle electronic control apparatus according to claim 19, wherein the equivalent discharging resistor is connected with the emitter terminal side or the source terminal side of the discharging transistor, and a heat dispersing resistor is connected in series with the collector terminal side or the drain terminal side of the discharging transistor, and wherein a dispersing resistance Re, which is the resistance value of the heat dispersing resistor, is set to be larger than the value of the discharge resistance Rx, which is the resistance value of the equivalent discharging resistor.

* * * * *